US012117748B2

(12) United States Patent
Fujiwara

(10) Patent No.: US 12,117,748 B2
(45) Date of Patent: Oct. 15, 2024

(54) FIXING DEVICE AND IMAGE FORMING APPARATUS INCORPORATING SAME

(71) Applicant: Hitoshi Fujiwara, Kanagawa (JP)

(72) Inventor: Hitoshi Fujiwara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/142,031

(22) Filed: May 2, 2023

(65) Prior Publication Data

US 2023/0375965 A1 Nov. 23, 2023

(30) Foreign Application Priority Data

May 17, 2022 (JP) ................................ 2022-080849

(51) Int. Cl.
*G03G 15/20* (2006.01)

(52) U.S. Cl.
CPC ..... *G03G 15/2028* (2013.01); *G03G 15/2064* (2013.01)

(58) Field of Classification Search
CPC ...................... G03G 15/2028; G03G 15/2064
See application file for complete search history.

(56) References Cited

U.S. PATENT DOCUMENTS

2008/0003025 A1* 1/2008 Tsunoda ............ G03G 15/2028 399/328
2013/0330093 A1* 12/2013 Kakehi ............... G03G 15/657 399/16
2014/0356018 A1 12/2014 Nakamura et al.
2015/0177655 A1* 6/2015 Yamaguchi ........ G03G 15/2057 399/329
2015/0268598 A1 9/2015 Nagata
2015/0355583 A1 12/2015 Kondo
2016/0004194 A1 1/2016 Kondo
2020/0285178 A1 9/2020 Fujiwara
2020/0285182 A1 9/2020 Takahashi et al.
2020/0401068 A1 12/2020 Matsuda et al.
2021/0026279 A1 1/2021 Takahashi et al.
2021/0278790 A1 9/2021 Furuichi et al.
(Continued)

FOREIGN PATENT DOCUMENTS

JP 2002-162857 6/2002
JP 2002162857 A * 6/2002
(Continued)

OTHER PUBLICATIONS

JP_2009109574_A_I Machine Translation, Japan, Ogata, May 2009.*
(Continued)

*Primary Examiner* — Carla J Therrien
(74) *Attorney, Agent, or Firm* — XSENSUS LLP

(57) ABSTRACT

A fixing device includes a first rotator, a second rotator, a heater, a separator, and a resistor. The second rotator is in contact with an outer circumferential surface of the first rotator to form a nip through which a recording medium bearing an unfixed image passes. The heater includes a heat generator and heats the first rotator. The separator is in contact with an outer circumferential surface of the first rotator and separates the recording medium passing through the nip from the first rotator. The resistor couples the second rotator and the separator to the ground.

19 Claims, 24 Drawing Sheets

(56) References Cited

U.S. PATENT DOCUMENTS

| | | | |
|---|---|---|---|
| 2022/0075302 | A1 | 3/2022 | Iwaya et al. |
| 2022/0276593 | A1 | 9/2022 | Fujiwara |
| 2022/0397847 | A1 | 12/2022 | Fujiwara |
| 2023/0004110 | A1 | 1/2023 | Fujiwara |

FOREIGN PATENT DOCUMENTS

| | | | | |
|---|---|---|---|---|
| JP | 2009-093017 | | 4/2009 | |
| JP | 2009109574 A | * | 5/2009 | ......... G03G 15/2028 |
| JP | 2020-052345 | | 4/2020 | |

OTHER PUBLICATIONS

JP_2002162857_A_I Machine Translation, Japan, Kuribayashi, Jul. 2002.*
U.S. Appl. No. 17/967,908, filed Oct. 18, 2022, Hitoshi Fujiwara.
U.S. Appl. No. 17/978,993, filed Nov. 2, 2022, Hitoshi Fujiwara.
Extended European Search Report issued Sep. 6, 2023 in European Patent Application No. 23169816.8, 9 pages.

* cited by examiner

FIXING DEVICE AND IMAGE FORMING APPARATUS INCORPORATING SAME

CROSS-REFERENCE TO RELATED APPLICATIONS

This patent application is based on and claims priority pursuant to 35 U.S.C. § 119(a) to Japanese Patent Application No. 2022-080849, filed on May 17, 2022, in the Japan Patent Office, the entire disclosure of which is hereby incorporated by reference herein.

BACKGROUND

Technical Field

Embodiments of the present disclosure generally relate to a fixing device and an image forming apparatus incorporating the fixing device.

Related Art

An electrophotographic image forming apparatus such as a copier or a printer includes a fixing device to fix a toner image onto a recording medium such as a sheet. The fixing device includes a pair of rotators that heats and presses the recording medium to fix the toner image onto the recording medium and conveys the recording medium.

SUMMARY

This specification describes an improved fixing device that includes a first rotator, a second rotator, a heater, a separator, and a resistor. The second rotator is in contact with an outer circumferential surface of the first rotator to form a nip through which a recording medium bearing an unfixed image passes. The heater includes a heat generator and heats the first rotator. The separator is in contact with an outer circumferential surface of the first rotator and separates the recording medium passing through the nip from the first rotator. The resistor couples the second rotator and the separator to the ground.

This specification also describes an image forming apparatus including the fixing device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
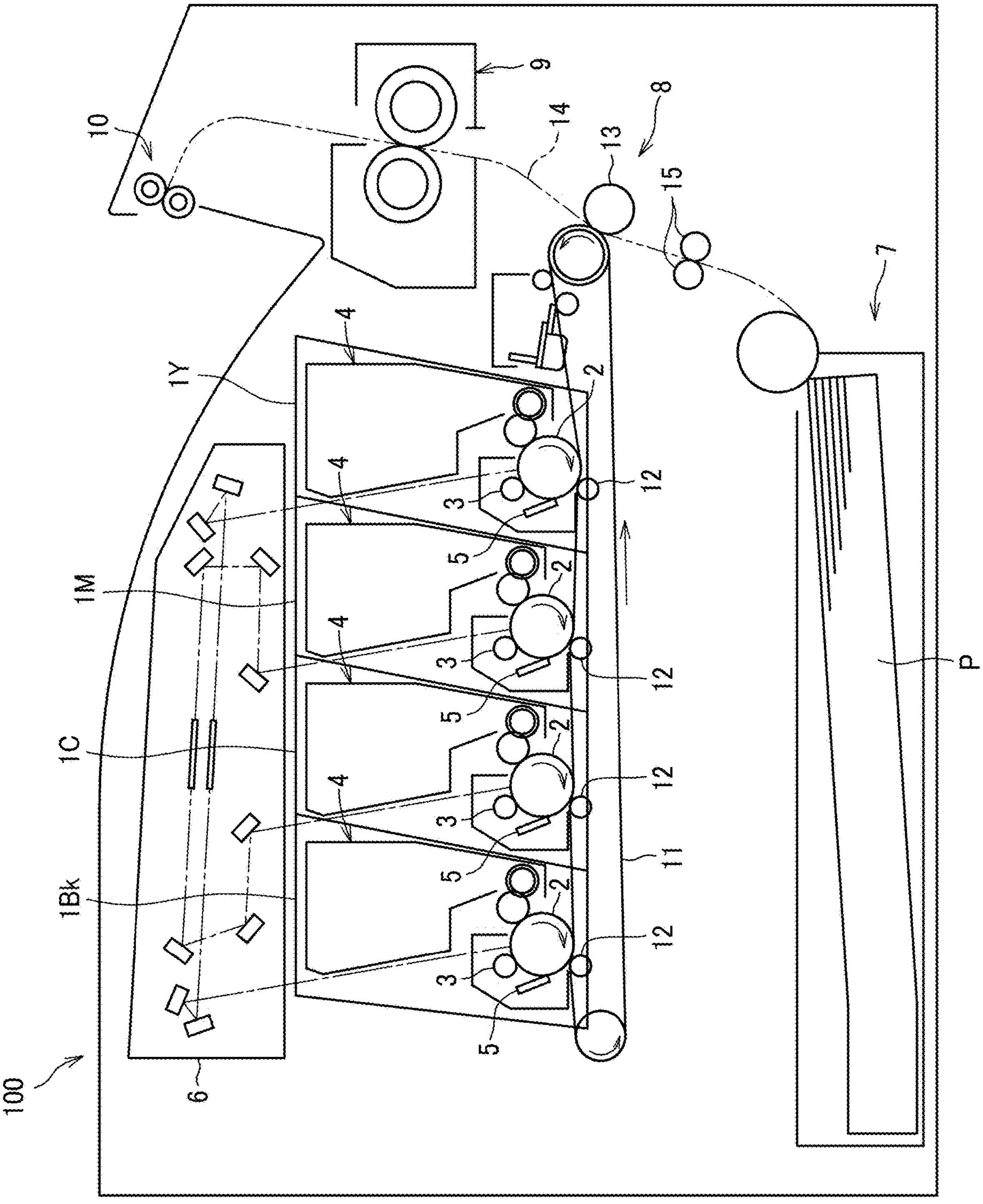
FIG. 1 is a schematic cross-sectional view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

With reference to drawings, descriptions are given below of embodiments of the present disclosure. In the drawings illustrating embodiments of the present disclosure, elements or components having identical or similar functions or shapes are given similar reference numerals as far as distinguishable, and redundant descriptions are omitted.

FIG. 1 is a schematic cross-sectional view of an image forming apparatus 100 according to an embodiment of the present disclosure. In the following description, the "image forming apparatus" includes a printer, a copier, a scanner, a facsimile machine, or a multifunction peripheral having at least two of printing, copying, scanning, and facsimile functions. The term "image formation" indicates an action for providing (i.e., printing) not only an image having a meaning, such as texts and figures on a recording medium, but also an image having no meaning, such as patterns on the recording medium. Initially, with reference to FIG. 1, a description is given of an overall configuration and operation of the image forming apparatus 100 according to the embodiment of the present disclosure.

The image forming apparatus 100 illustrated in FIG. 1 includes four image forming units 1Y, 1M, 1C, and 1Bk detachably attached to an image forming apparatus body. The image forming units 1Y, 1M, 1C, and 1Bk have substantially the same configuration except for containing different color developers, i.e., yellow (Y), magenta (M), cyan (C), and black (Bk) toners, respectively. The colors of the developers correspond to color separation components of full-color images. Each of the image forming units 1Y, 1M, 1C, and 1Bk includes a drum-shaped photoconductor 2 as an image bearer, a charging device 3, a developing device 4, and a cleaning device 5.

The image forming apparatus 100 includes an exposure device 6, a sheet feeder 7, a transfer device 8, a fixing device 9, and a sheet ejection device 10. The image forming units 1Y, 1M, 1C, and 1Bk, photoconductors 2, the charging devices 3, the exposure device 6, the transfer device 8, and the like configure an image forming device that forms the toner image on the sheet P.

The transfer device 8 includes an intermediate transfer belt 11 having an endless form and serving as an intermediate transferor, four primary transfer rollers 12 serving as primary transferors, and a secondary transfer roller 13 serving as a secondary transferor. The intermediate transfer belt 11 is an endless belt stretched by a plurality of rollers. Each of the primary transfer rollers 12 is in contact with the corresponding photoconductor 2 via the intermediate transfer belt 11 to form a primary transfer nip between the intermediate transfer belt 11 and each photoconductor 2. On the other hand, the secondary transfer roller 13 is in contact with, via the intermediate transfer belt 11, one of a plurality of rollers around which the intermediate transfer belt 11 is stretched to form a secondary transfer nip between the secondary transfer roller 13 and the intermediate transfer belt 11.

A timing roller pair 15 is disposed in a sheet conveyance path 14 at a position between the sheet feeder 7 and the secondary transfer nip defined by the secondary transfer roller 13.

Referring to FIG. 1, a description is provided of printing processes performed by the image forming apparatus 100 described above.

When the image forming apparatus 100 receives an instruction to start printing, a driver drives and rotates the photoconductor 2 clockwise in FIG. 1 in each of the image forming units 1Y, 1M, 1C, and 1Bk. The charging device 3 charges the surface of the photoconductor 2 uniformly at a high electric potential. Next, the exposure device 6 exposes the surface of each photoconductor 2 based on image data of the document read by the document reading device or print data instructed to be printed from a terminal. As a result, the potential of the exposed portion on the surface of each photoconductor 2 decreases, and an electrostatic latent image is formed on the surface of each photoconductor 2. The developing device 4 supplies the toner as the developer to the electrostatic latent image, forming a toner image on each photoconductor 2.

The toner image formed on each of the photoconductors 2 reaches the primary transfer nip defined by each of the primary transfer rollers 12 in accordance with rotation of each of the photoconductors 2. The toner images are sequentially transferred and superimposed onto the intermediate transfer belt 11 that is driven to rotate counterclockwise in FIG. 1 to form a full color toner image. Thus, a composite, full-color toner image is formed on the surface of the intermediate transfer belt 11. After the toner image is transferred from the photoconductor 2 onto the intermediate transfer belt 11, the cleaning device 5 removes residual toner and foreign substances such as paper dust that are remained on the photoconductor 2 from the surface of the photoconductor 2.

The full color toner image transferred to the intermediate transfer belt 11 is conveyed to the secondary transfer nip defined by the secondary transfer roller 13 in accordance with rotation of the intermediate transfer belt 11. The full color toner image is transferred onto a sheet P as a recording medium conveyed to the secondary transfer nip. The sheet P is supplied from the sheet feeder 7. The recording medium P may be a sheet of plain paper, thick paper, thin paper, a postcard, an envelope, coated paper, art paper, tracing paper, overhead projector (OHP) transparency, plastic film, prepreg, copper foil, or the like.

The timing roller pair 15 temporarily halts the sheet P supplied from the sheet feeder 7. Thereafter, the timing roller pair 15 conveys the sheet P to the secondary transfer nip so that the sheet P meets the full color toner image formed on the intermediate transfer belt 11 at the secondary transfer nip. As a result, the full color toner image is transferred onto the sheet P.

After the full color toner image is transferred onto the sheet P, the sheet P is conveyed to the fixing device 9 to fix the full color toner image onto the sheet P. Thereafter, the sheet ejection device 10 ejects the sheet P onto the outside of the image forming apparatus 100, thus finishing a series of printing processes.

Figure 2:
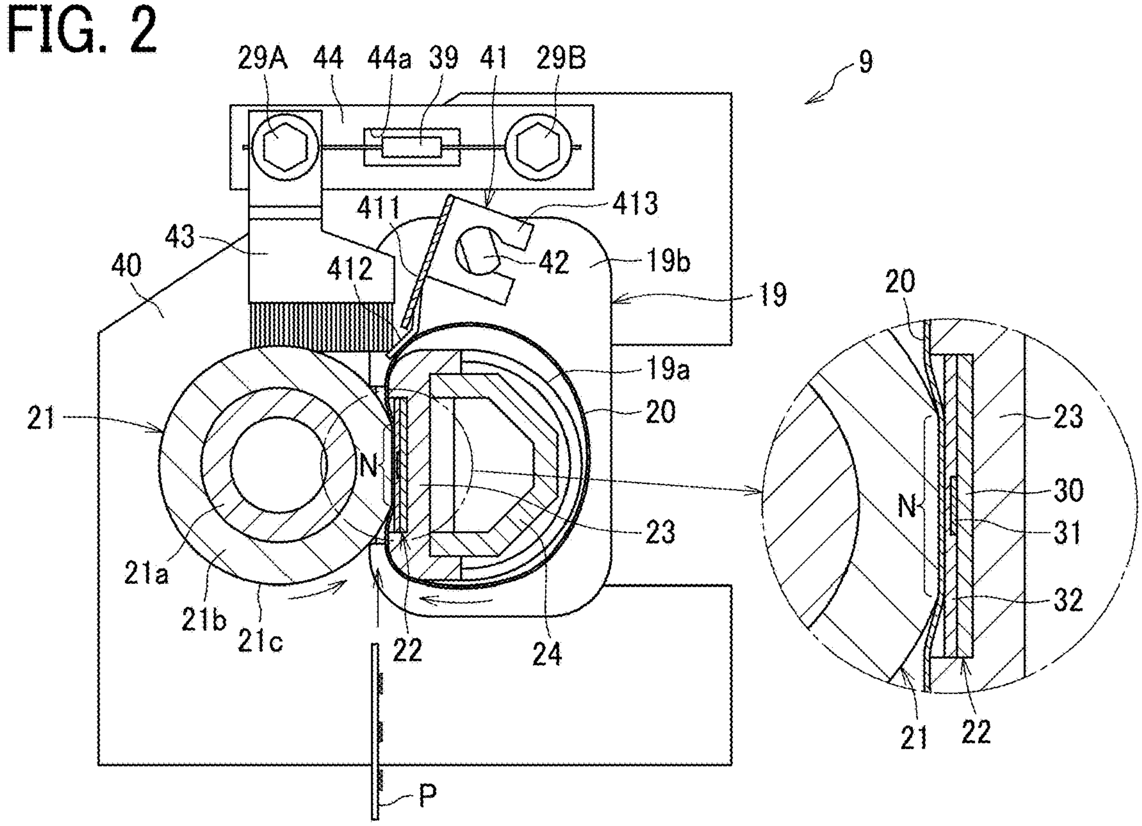
FIG. 2 is a vertical cross-sectional view of the fixing device according to a first embodiment viewed from a lateral side of the fixing device.
Figure 3:
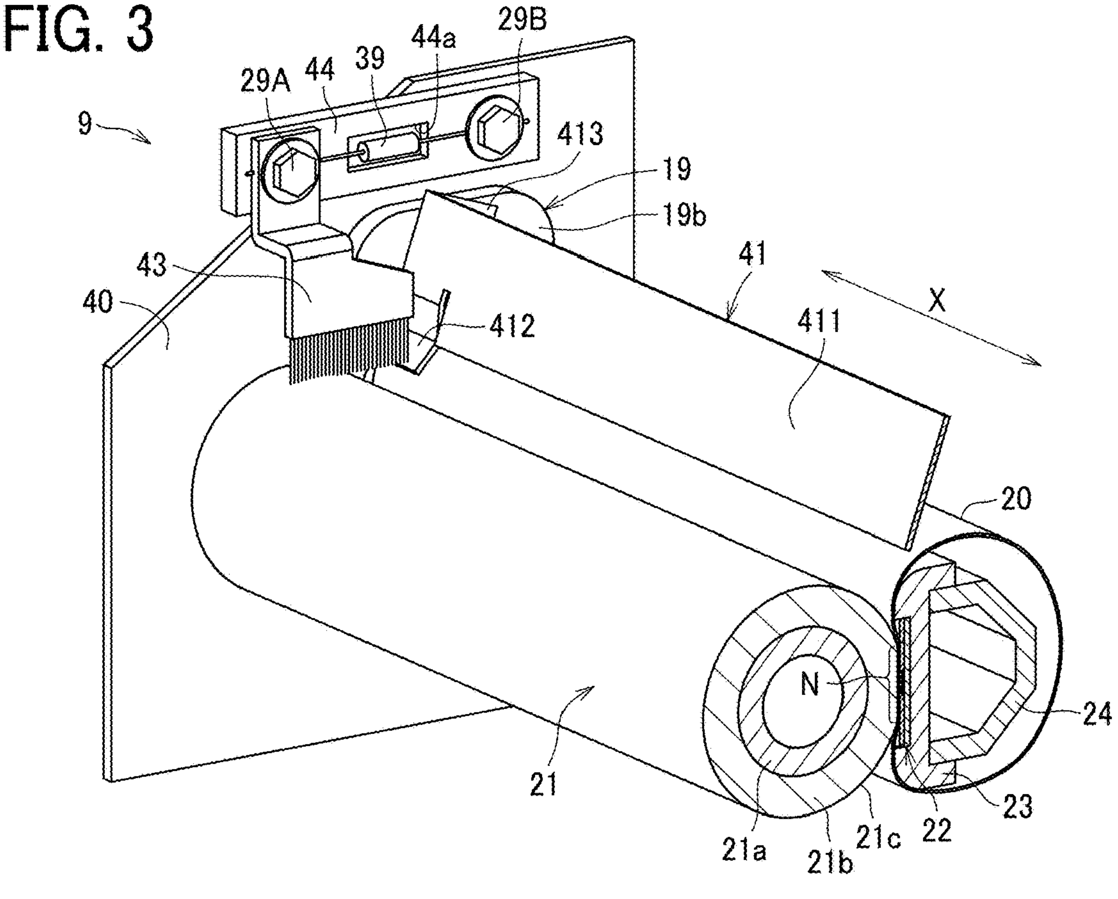
FIG. 3 is a perspective view of a part of the fixing device of FIG. 2 including a cross-sectional view of rotators.

Next, with reference to FIGS. 2 and 3, a description is given of the configuration of the fixing device 9 according to the present embodiment.

FIG. 2 is a vertical cross-sectional view of the fixing device 9 viewed from a lateral side of the fixing device 9, and FIG. 3 is a perspective view of a part of the fixing device 9 with the vertical cross-sectional view of rotators.

As illustrated in FIGS. 2 and 3, the fixing device 9 according to the present embodiment includes side plates 40, a fixing belt 20, a pressure roller 21, belt holders 19, a heater 22, a heater holder 23, a stay 24, and a separation plate 41. The fixing device 9 is configured to be attachable to and detachable from the image forming apparatus main body.

The side plates 40 are members including at least a part of a housing of the fixing device 9. The side plates 40 are disposed on both sides of the fixing device 9 in a direction indicated by an arrow X in FIG. 3 that is a longitudinal direction of the fixing belt 20, the heater 22, the heater holder 23, the stay 24, and the separation plate 41. The longitudinal direction is also an axial direction of the pressure roller 21 and also a width direction of the sheet P. The side plate 40 is made of metal and is grounded.

The fixing belt 20 is a first rotator disposed so as to face a surface of the sheet that is the surface bearing an unfixed image. The fixing belt 20 is a fixing rotator that comes into contact with the unfixed image borne on the surface of the sheet to fix the unfixed toner image onto the sheet. The fixing belt 20 is, for example, an endless belt including a tubular base made of polyimide (PI). The tubular base has an outer diameter of 25 mm and a thickness of from 40 μm to 120 μm. The base of the fixing belt 20 may be made of heat resistant resin such as polyetheretherketone (PEEK) or metal such as nickel (Ni) or steel use stainless (SUS), instead of polyimide. The fixing belt 20 further includes a release layer serving as an outermost surface layer. The release layer is made of fluororesin, such as tetrafluoroethylene-perfluoroalkylvinylether copolymer (PFA) or polytetrafluoroethylene (PTFE) and has a thickness of from 5 μm to 50 μm to enhance durability of the fixing belt 20 and facilitate separation of the sheet P from the fixing belt 20. Optionally, an elastic layer that is made of rubber or the like and has a thickness in a range of from 50 μm to 500 μm may be interposed between the base and the release layer. Additionally, a sliding layer made of polyimide, PTFE, or the like may be provided on the inner circumferential surface of the fixing belt 20.

The pressure roller 21 is an opposed member disposed opposite an outer circumferential surface of the fixing belt 20 and is referred to as a second rotator different from the first rotator that is the fixing belt 20. The pressure roller 21 has an outer diameter of 25 mm, for example. The pressure roller 21 includes a core **21*a* as a first layer, an elastic layer 21*b* as a second layer layered on the core, and a release layer 21*c* as a third layer layered on the elastic layer. The core 21*a* is made of a conductive material such as iron. The core 21*a* may have a hollow cylindrical shape or may have a solid shaft shape. The elastic layer 21*b* is made of a non-conductive material such as silicone rubber and has a thickness of, for example, 3.5 mm. The elastic layer 21*b* may have conductivity. However, the elastic layer 21*b* as a non-conductive layer does not include a conductive material such as a filler, which is helpful to secure the elasticity and stretchability of the elastic layer 21*b*. The release layer 21*c*** has, for example, a thickness of about 40 μm and is made of fluororesin or the like.

The pressure roller 21 is pressed against the fixing belt 20 by a biasing member such as a spring. As a result, the pressure roller 21 is pressed against the heater 22 via the fixing belt 20 to form a nip N (that is, a fixing nip) between the fixing belt 20 and the pressure roller 21. A driver drives and rotates the pressure roller 21 in a direction indicated by an arrow in FIG. 2, and the rotation of the pressure roller 21 rotates the fixing belt 20.

The belt holders 19 are rotator holders holding the fixing belt 20. The belt holders 19 are disposed at both ends of the fixing belt 20 in the longitudinal direction of the fixing belt 20, respectively and rotatably hold both ends of the fixing belt 20 in the longitudinal direction. Specifically, the belt holder 19 includes a holding portion **19*a* (see FIG. 2) and a base 19*b*. The holding portion 19*a* has a cylindrical shape or C-shape and is inserted into the loop of the fixing belt 20. The base 19*b* is a plate holding the holding portion 19*a*. The holding portion 19*a* is inserted into the longitudinal end of the fixing belt 20 to hold the inner side of the fixing belt 20 such that the fixing belt 20 can rotate. The base 19*b* is disposed so as to face a longitudinal edge of the fixing belt 20. The base 19*b* comes into contact with the longitudinal edge of the fixing belt 20 deviating in the longitudinal direction of the fixing belt 20 and functions as a regulator that regulates movement (deviation) of the fixing belt 20** in the longitudinal direction.

The heater 22 is a planar heater extending in a direction indicated by an arrow X in FIG. 3 that is the longitudinal direction of the fixing belt 20. As illustrated in an enlarged view of FIG. 2, the heater 22 includes a planar base 30, resistive heat generators 31 disposed on the base 30, and an insulation layer 32 covering the resistive heat generators 31. The insulation layer 32 of the heater 22 contacts the inner circumferential surface of the fixing belt 20, and heat generated by the resistive heat generators 31 is transmitted to the fixing belt 20 through the insulation layer 32. Although the resistive heat generators 31 and the insulation layer 32 are disposed on the side of the base 30 facing the fixing belt 20 (that is, the fixing nip N) in the present embodiment, the resistive heat generators 31 and the insulation layer 32 may be disposed on the opposite side of the base 30, that is, the side facing the heater holder 23. In this case, since the heat of the resistive heat generator 31 is transmitted to the fixing belt 20 through the base 30, it is preferable that the base 30 be made of a material with high thermal conductivity such as aluminum nitride.

As power is supplied to the resistive heat generators 31 in the heater 22, the resistive heat generator 31 generates heat to heat the fixing belt 20. The temperature of the fixing belt 20 reaches a predetermined target temperature (that is, a fixing temperature). The sheet P bearing an unfixed toner image is conveyed to the nip N between the rotating fixing belt 20 and the rotating pressure roller 21. The fixing belt 20 and the pressure roller 21 apply heat and pressure to the unfixed toner image on the sheet P to fix the toner image onto the sheet P.

The heater holder 23 holds the heater 22. Since the heater holder 23 is subject to temperature increase by heat from the heater 22, the heater holder 23 is preferably made of a heat-resistant material. The heater holder 23 made of heat-resistant resin having low thermal conduction, such as a liquid crystal polymer (LCP), reduces heat transfer from the heater 22 to the heater holder 23, thus allowing the heater 22 to effectively heat the fixing belt 20.

The stay 24 supports the heater holder 23. Here, "the stay 24 supports the heater holder 23" means that the stay 24 comes into contact with a stay side of the heater holder 23 to receive a pressing force of the pressure roller 21. The stay side of the heater holder 23 is opposite a side facing the pressure roller 21. The stay side of the heater holder 23 is a right side of the heater holder 23 in FIG. 2. The above-described configuration can reduce a bend of the heater holder 23 (in particular, the bend in the longitudinal direction of the heater holder 23) caused by the pressing force of the pressure roller 21, thus stably forming the fixing nip N between the fixing belt 20 and the pressure roller 21. The stay 24 may be in contact with the heater holder 23 with another member interposed between the stay 24 and the heater holder 23. For example, the pair of side plates 40 supports both ends of the stay 24 in the longitudinal direction of the stay 24. The stay 24 is preferably made of an iron-based metal material such as SUS or steel electrolytic cold commercial (SECC) to enhance the rigidity.

The separation plate 41 is a separator to separates the sheet P from the surface of the fixing belt 20 after the sheet P passes through the nip N. The separation plate 41 is made of metal such as rustproof iron, stainless steel, or aluminum. The separation plate 41 is disposed downstream from the nip in a sheet conveyance direction. The separation plate 41 includes a separation portion 411, an abutment portion 412, and attachment portions 413. The separation portion 411 is disposed close to the surface (an outer circumferential surface) of the fixing belt 20 and downstream from the nip N in the sheet conveyance direction. After the sheet P passes through the nip N, the sheet P comes into contact with separation portion 411 and is separated from the surface of the fixing belt 20 by the separation portion 411. The separation portion 411 extends over a range larger than a maximum sheet passing region (in other words, a maximum recording medium passing region) through which a sheet having a maximum width passes so as to be able to separate sheets having various widths. The sheet having the maximum width in the present specification is a sheet having the largest width among sheets described in a user's manual, a catalog, or the like of the image forming apparatus. The abutment portion 412 is branched from the main body of the separation plate 41 including the separation portion 411 and comes into contact with the outer circumferential surface of the fixing belt 20 downstream from the nip N in the sheet conveyance direction. In order to avoid abrasion and damage of the outer circumferential surface of the fixing belt 20 in a sheet passing region, the abutment portion 412 is in contact with the fixing belt 20 at a position facing a region outside the maximum sheet passing region. The attachment portions 413 are disposed at both ends of the separation plate 41 in the longitudinal direction and are attached to support shafts 42 (see FIG. 2) disposed on the pair of belt holders 19. The attachment portion 413 is rotatably supported by the support shaft 42. Accordingly, the separation plate 41 (that is, the tip of the separation portion 411) is configured to be displaceable in a direction toward and away from the outer circumferential surface of the fixing belt 20. A biasing member such as a torsion spring biases the separation plate 41 toward the outer circumferential surface of the fixing belt 20 so that the abutment portion 412 is basically held in contact with the outer circumferential surface of the fixing belt 20.

Figure 4:
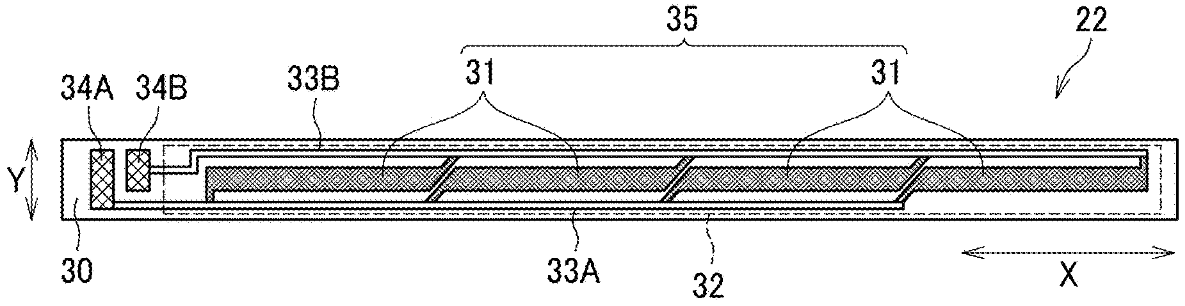
FIG. 4 is a plan view of a heater according to the present embodiment.

FIG. 4 is a plan view of the heater according to the present embodiment.

As illustrated in FIG. 4, the heater 22 includes the planar base 30. On the surface of the base 30, a plurality of resistive heat generators 31 (four resistive heat generators 31), power supply lines 33A and 33B that are conductors, a first electrode 34A, and a second electrode 34B are disposed. However, the number of resistive heat generators 31 is not limited to four in the present embodiment.

The plurality of resistive heat generators 31 are arranged at intervals in the longitudinal direction of the heater 22 (that is, the direction indicated by the arrow X in FIG. 4). Therefore, the longitudinal direction of the heater 22 is also an arrangement direction of the plurality of resistive heat generators 31 in the present embodiment. Hereinafter, the direction X is also simply referred to as the arrangement direction. In addition, a direction that intersects the arrangement direction of the plurality of resistive heat generators 31 and is different from a thickness direction of the base 30 is referred to as a direction intersecting the arrangement direction. In the present embodiment, the direction intersecting the arrangement direction is the vertical direction Y in FIG. 4. The direction Y intersecting the arrangement direction is a direction along the surface of the base 30 on which the resistive heat generators 31 are arranged and is also a short-side direction of the heater 22 and a conveyance direction of the sheet P passing through the fixing device 9.

The plurality of resistive heat generators 31 configure a heat generation portion 35 including portions arranged in the arrangement direction. The resistive heat generators 31 are electrically coupled in parallel to a pair of electrodes 34A and 34B disposed on one end of the base 30 in the arrangement direction (that is a left end of the base 30 in FIG. 4) via the power supply lines 33A and 33B. The power supply lines 33A and 33B are made of conductors having an electrical resistance value smaller than an electrical resistance value of the resistive heat generator 31. A gap between neighboring resistive heat generators 31 is preferably 0.2 mm or more, more preferably 0.4 mm or more from the viewpoint of maintaining the insulation between the neighboring resistive heat generators 31. If the gap between the neighboring resistive heat generators 31 is too large, the gap is likely to cause temperature decrease in a region corresponding to the gap. Accordingly, from the viewpoint of reducing the temperature unevenness in the arrangement direction, the gap is preferably equal to or shorter than 5 mm, and more preferably equal to or shorter than 1 mm.

The resistive heat generator 31 according to the present embodiment is made of a material having a positive temperature coefficient (PTC) of resistance that is a characteristic that the resistance value increases (the heater output decreases) as the temperature T increases.

In the present embodiment, the temperature coefficient of resistance of the resistive heat generator 31 is 500 ppm.

Dividing the heat generation portion 35 configured by the resistive heat generators 31 having the PTC characteristic in the arrangement direction prevents overheating of the fixing belt 20 when small sheets continuously pass through the fixing device 9. When the small sheets each having a width smaller than the entire width of the heat generation portion 35 pass through the fixing device 9, the temperature of a region of the resistive heat generator 31 corresponding to a region of the fixing belt 20 outside the small sheet increases because the small sheet does not absorb heat of the fixing belt 20 in the region outside the small sheet that is the region outside the width of the small sheet. Since a constant voltage is applied to the resistive heat generators 31, the increase in resistance values of the resistive heat generators 31 caused by the temperature increase in the regions outside the width of the small sheets relatively reduces outputs (heat generation amounts) of the resistive heat generators 31 in the regions, thus restraining an increase in temperature in the regions of the fixing belt outside the small sheets. In the present embodiment, electrically coupling the plurality of resistive heat generators 31 in parallel can restrain temperature rises in non-sheet passing regions while maintaining the print speed. Heat generators that configure the heat generation portion 35 may not be the resistive heat generators each having the PTC characteristic. The resistive heat generators in the heater 22 may be arranged in a plurality of rows arranged in the direction intersecting the arrangement direction.

The resistive heat generator 31 is produced by, for example, mixing silver-palladium (AgPd), glass powder, and the like into a paste. The paste is coated on the base 30 by screen printing or the like. Thereafter, the base 30 is fired to form the resistive heat generator 31. The resistive heat generators 31 each have a resistance value of 80Ω at room temperature, in the present embodiment. The material of the resistive heat generators 31 may contain a resistance material, such as silver alloy (AgPt) or ruthenium oxide ($RuO_2$), other than the above material. Silver (Ag) or silver palladium (AgPd) may be used as a material of the power supply lines 33A and 33B and the electrodes 34A and 34B. Screen-printing such a material forms the power supply lines 33A and 33B and the electrodes 34A and 34B. The power supply lines 33A and 33B are made of conductors having the electrical resistance value smaller than the electrical resistance value of the resistive heat generators 31.

The material of the base 30 is preferably a nonmetallic material having excellent thermal resistance and insulating properties, such as glass, mica, or ceramic such as alumina or aluminum nitride. The heater 22 according to the present embodiment includes an alumina base having a thickness of 1.0 mm, a width of 270 mm in the arrangement direction, and a width of 8 mm in the direction intersecting the arrangement direction. Alternatively, the base 30 may be made by layering the insulation material on conductive material such as metal. Low-cost aluminum or stainless steel is favorable as the metal material of the base 30. The base 30 made of a stainless steel plate is resistant to cracking due to thermal stress. To improve thermal uniformity of the heater 22 and image quality, the base 30 may be made of a material having high thermal conductivity, such as copper, graphite, or graphene.

The insulation layer 32 may be, for example, a thermal resistance glass having a thickness of 75 μm. The insulation layer 32 covers the resistive heat generators 31 and the power supply lines 33A and 33B to insulate and protect the resistive heat generators 31 and the power supply lines 33A and 33B and maintain sliding performance with the fixing belt 20.

Figure 5:
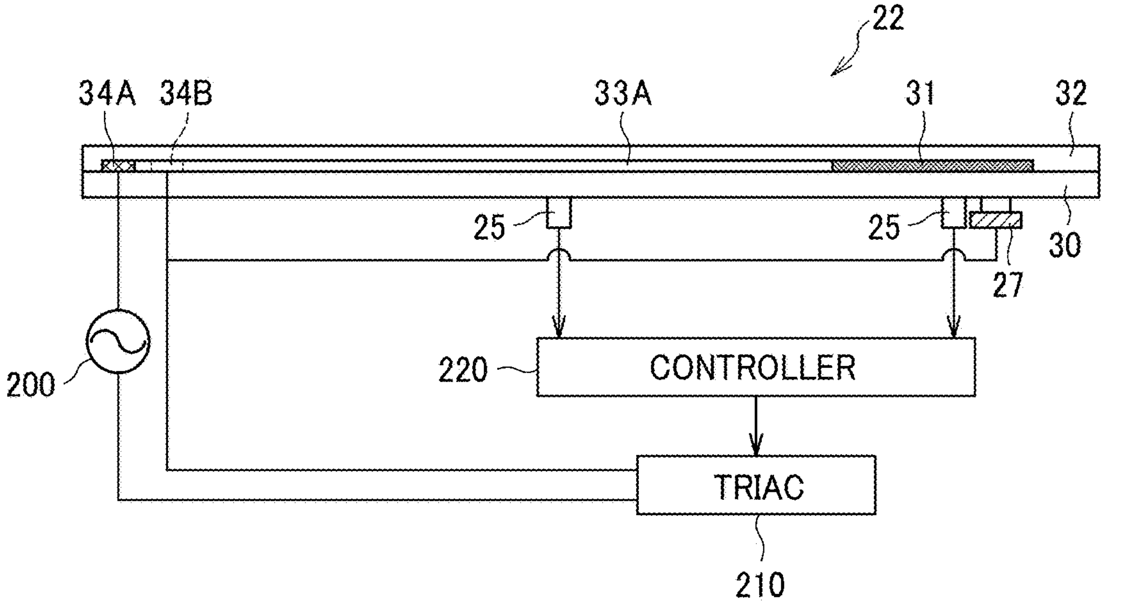
FIG. 5 is a schematic diagram illustrating a circuit to supply power to the heater according to the present embodiment.

FIG. 5 is a schematic diagram illustrating a circuit to supply power to the heater according to the present embodiment.

As illustrated in FIG. 5, an alternating current power supply 200 is electrically coupled to the electrodes 34A and 34B of the heater 22 to configure a power supply circuit in the present embodiment to supply power to the resistive heat generators 31. The power supply circuit includes a triac 210 that controls an amount of power supplied. A controller 220 controls the amount of power supplied to the resistive heat generators 31 via the triac 210 based on temperatures detected by thermistors 25 as temperature sensors. The controller 220 includes a microcomputer including, for example, a central processing unit (CPU), a read only memory (ROM), a random access memory (RAM), and an input and output (I/O) interface.

In the present embodiment, one thermistor 25 is disposed on a central region of the heater 22 in the arrangement direction that is the region inside a sheet conveyance span for the smallest sheet, and the other thermistor 25 is disposed on one end portion of the heater 22 in the arrangement direction. A thermostat 27 as a power cut-off device is disposed on the one end portion of the heater 22 in the arrangement direction and cuts off power supply to the resistive heat generators 31 when the temperature of the resistive heat generator 31 becomes a predetermined temperature or higher. The thermistor 25 and the thermostat 27 contact the heater 22 to detect the temperature of the heater 22.

In order for the separation plate 41 to reliably separate the sheet P from the fixing belt 20, the tip of the separation portion 411 of the separation plate 41 is preferably close to the outer circumferential surface of the fixing belt 20 at a position downstream from the nip N in the sheet conveyance direction. Since the separation plate 41 made of metal in the present embodiment has high dimensional accuracy, the tip of the separation plate 41 can be set close to the outer circumferential surface of the fixing belt 20.

However, since the fixing belt 20 is made of a flexible material, rotating the fixing belt 20 causes fluctuation of a rotation orbit of the fixing belt 20, which may cause fluctuation of a gap between the surface of the fixing belt 20 and the tip of the separation plate 41 facing the fixing belt 20. In order to cope with the fluctuation of the gap, the separation plate 41 according to the present embodiment includes the abutment portion 412 that comes into contact with the surface of the fixing belt 20 to follow the fluctuation of the rotation orbit of the fixing belt 20. As a result, the separation plate 41 can follow the fluctuation of the gap even when the rotation orbit of the fixing belt 20 fluctuates due to rotations of the fixing belt 20. That is, the tip of the separation plate 41 in the present embodiment follows change of a surface position of the fixing belt 20, which enables maintaining a desired gap between the surface of the fixing belt 20 and the tip of the separation plate 41. As a result, the separation plate 41 can stably separate the sheet from the fixing belt 20.

However, the separation plate 41 made of metal includes the abutment portion 412 coming into contact with the surface of the fixing belt 20. If the insulation layer 32 of the heater 22 is broken, the current supplied to the heater 22 may flow to the side plate 40 via the fixing belt 20 and the conductive separation plate 41. Flowing the current from the heater 22 to the side plate 40 causes fluctuation in the amount of heat generated by the heater 22. As a result, the temperature to fix the image onto the sheet varies, and the fixing quality deteriorates. In addition, the current flowing out through the side plate 40 charges a component in the image forming apparatus, the toner adheres to the charged component to stain the component. When an operator touches the component during a jam processing or the like, the hand of the operator is stained by the toner.

The above-described disadvantage caused by electric leakage of the heater 22 is particularly likely to occur in the planar heater 22 of the present embodiment. This is because the planar heater 22 includes the insulation layer 32 generally formed thinner than 0. 1 mm that may be damaged.

In the fixing device including the planar heater 22 having the thin insulation layer and the separation plate 41 in contact with the surface of the fixing belt 20, the damage of the insulation layer causes flowing the current supplied to the heater 22 to the side plate 40 via the separation plate 41, which may affect the heat generation amount of the heater 22 and give the electric adverse effect to the component in the image forming apparatus. In addition, the current may flow to the surface of the pressure roller 21 via the fixing belt 20, charge the surface of the pressure roller 21, and change the potential difference between the fixing belt 20 and the pressure roller 21. As a result, a part of the toner image on the sheet adheres to the fixing belt 20 and may cause an abnormal image such as an electrical offset. To cope with the above-described disadvantage, the pressure roller 21 and the separation plate 41 are grounded via a certain insulation resistance. Setting a resistor to ground the pressure roller 21 and another resistor to ground the separation plate 41 causes disadvantages, that is, the increase in the number of components, the size of the fixing device, and the manufacturing cost. To deal with the disadvantages, the fixing device according to the present embodiment has the following structure to reduce the number of components and ground the separation plate 41 and the pressure roller 21 via the certain insulation resistance.

With continued reference to FIGS. 2 and 3, a description is given of the structure according to a first embodiment to ground the separation plate 41 and pressure roller 21.

As illustrated in FIGS. 2 and 3, the fixing device 9 according to the first embodiment includes a discharging brush 43 as a discharger and a resistor 39 electrically coupling the discharging brush 43 and the side plate 40. The discharging brush 43 and the resistor 39 are members included in a grounding structure of the separation plate 41 and the pressure roller 21.

The discharging brush 43 is made of a conductive member such as stainless steel fiber or resin fiber such as acrylic or polyester with metal plating. The discharging brush 43 is disposed downstream from the nip N in the sheet conveyance direction such that a part of tips of brushes is in contact with the abutment portion 412 of the separation plate 41, and the other part of tips of brushes is in contact with the surface of the pressure roller 21 (that is, the release layer 21*c*). The discharging brush 43 is attached to a resistor holder 44 holding the resistor 39, and the resistor holder 44 is attached to the side plate 40.

The resistor 39 includes a body and lead wires attached to the body and is held by the resistor holder 44. Specifically, one end of the lead wire of the resistor 39 is sandwiched and held by the resistor holder 44 and the head of a screw 29A that fixes the discharging brush 43 to the resistor holder 44, and one end of the other lead wire of the resistor 39 is sandwiched and held by the resistor holder 44 and the head of a screw 29B that fixes the resistor holder 44 to the side plate 40. The body of the resistor 39 is inside a hole 44*a* of the resistor holder 44 and not in contact with the resistor holder 44.

As described above, the two screws 29A and 29B fix the resistor 39 on the discharging brush 43 and the resistor holder 44. As a result, the discharging brush 43 is electrically coupled to the grounded side plate 40 via the resistor 39 and the resistor holder 44. Since the discharging brush 43 is in direct contact with both the separation plate 41 and the pressure roller 21, the charge stored on the separation plate 41 and the pressure roller 21 flows to the side plate 40 via the discharging brush 43 and is removed.

If the discharging brush 43 removes too much charge from the separation plate 41 and the pressure roller 21, a current flows from the heater 22 to the side plate 40 via the separation plate 41, which may cause the fluctuation in the amount of heat generated by the heater 22. In addition, a transfer current may flow from the secondary transfer nip to the discharging brush 43 via the sheet nipped by both the secondary transfer nip and the fixing nip N and the pressure roller 21, and transfer failure may occur.

To deal with the above-described disadvantages, the fixing device according to the present embodiment includes the resistor 39 interposed between the discharging brush 43 and the side plate 40. The resistor 39 ensures the certain insulation resistance between the separation plate 41 and the side plate 40 and the certain insulation resistance between the pressure roller 21 and the side plate 40 and has an electric resistance value to flow an appropriate amount of current between the discharging brush 43 and the side plate 40. The electric resistance value of the resistor 39 is set to be higher than the electric resistance value of the side plate 40 and lower than the electric resistance value of the resistor holder 44. Setting the electric resistance value of the resistor 39 so that the current appropriately flows from the separation plate 41 and the pressure roller 21 to the side plate 40 via the resistor 39 as described above prevents the charge from being stored in the separation plate 41 and the pressure roller 21 and limits the current flowing from the separation plate 41 and the pressure roller 21 to the side plate 40. Note that the current does not flow from the surface of pressure roller 21 to the metal core 21*a* of the pressure roller 21 because the elastic layer 21*b* having a high electric resistance value is between the metal core 21*a* and the release layer 21*c*. Therefore, the current applied to the pressure roller 21 flows to the side plate 40 via the discharging brush 43 and the resistor 39. That is, the elastic layer 21*b* is made of a member having an electric resistance value higher than those of the resistor 39 and the discharging brush 43. The separation plate 41 according to the present embodiment is not directly attached to the metal side plate 40 but is assembled to the support shaft 42 of the belt holder 19 made of resin having a higher electric resistance value than the resistor 39 and the discharging brush 43. Therefore, the current applied to the separation plate 41 does not directly flow to the side plate 40 but flows to the side plate 40 via the discharging brush 43 and the resistor 39.

Since the above-described structure prevents the current applied to the heater 22 from excessively flowing to the side plate 40 via the fixing belt 20, separation plate 41 and pressure roller 21, the above-described structure can reduce the variation in the amount of heat generated by the heater 22 due to electric leakage and mitigate the disadvantage caused by the electronic components in the image forming apparatus charged by the current. In addition, since the above-described structure can prevent the separation plate 41 and the pressure roller 21 from storing charge, the above-described structure can mitigate the occurrence of the abnormal image such as the electrostatic offset caused by toner adhered from the part of the toner image on the sheet to the fixing belt 20.

Additionally, since both the separation plate 41 and the pressure roller 21 are grounded via the same (one) resistor 39 in the present embodiment, the above-described structure can reduce the number of components as compared with the fixing device including the resistor 39 coupled to the separation plate 41 and another resistor 39 coupled to the pressure roller 21. In the present embodiment, one discharging brush 43 coupled to the separation plate 41 and the pressure roller 21 merges grounding paths from the separation plate 41 and the pressure roller 21 to the ground into a single path. The above-described structure can reduce the number of the discharging brushes 43 and the resistor holders 44 to one, in addition to the resistor 39 forming the grounding path. As a result, the number of components can be reduced. Since the above-described structure in the present embodiment can reduce the number of various components of the grounding structure to ground the separation plate 41 and the pressure roller 21, the size and cost of the fixing device can be reduced.

As illustrated in FIGS. 2 and 3, the discharging brush 43 in the present embodiment is disposed downstream from the nip N in the sheet conveyance direction and between the pressure roller 21 and the separation plate 41, which reduces the size of the fixing device. That is, the discharging brush 43 in the present embodiment that is disposed close to the pressure roller 21 and the separation plate 41, which are the charge removing objects, can reduce a space to place the discharging brush 43, the pressure roller 21, and the separation plate 41, which reduces the size of the fixing device.

Preferably, a distance between the separation plate 41 and the side plate 40 and a distance between the pressure roller 21 and the side plate 40 are designed to satisfy a creepage distance corresponding to basic insulation. Specifically, it is preferable that a creepage distance between the separation plate 41 and the side plate 40 and a creepage distance between the pressure roller 21 and the side plate 40 (that is a distance between the pressure roller 21 and the closest portion of the side plate 40 to the pressure roller 21) be 2.5 mm or more. Setting the creepage distance between the separation plate 41 and the side plate 40 and the creepage distance between the pressure roller 21 and the side plate 40 to 2.5 mm or more enables ensuring the certain insulation resistance corresponding to basic insulation between the separation plate 41 and the side plate 40 and between the pressure roller 21 and the side plate 40, which is defined by International Electrotechnical Commission (IEC) 60950 for an apparatus using 200 V.

Next, other embodiments of the present disclosure are described focusing on portions different from the above-described first embodiment of the present disclosure. The other portions are basically the same as those of the above-described embodiment, and thus descriptions thereof are omitted.

Figure 6:
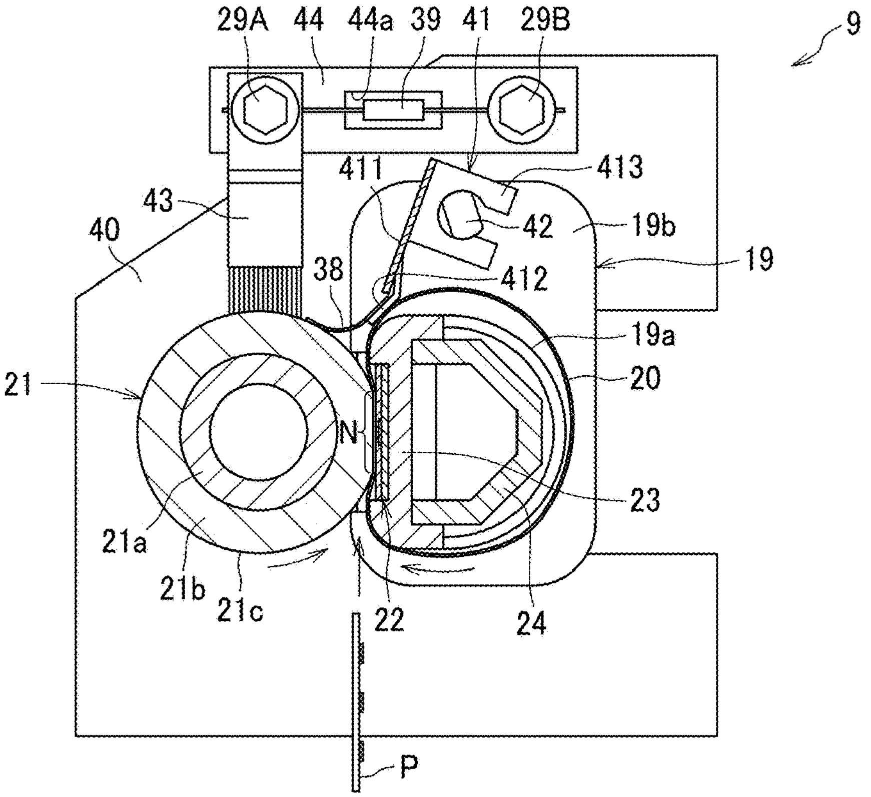
FIG. 6 is a vertical cross-sectional view of the fixing device according to a second embodiment of the present disclosure viewed from a lateral side of the fixing device.
Figure 7:
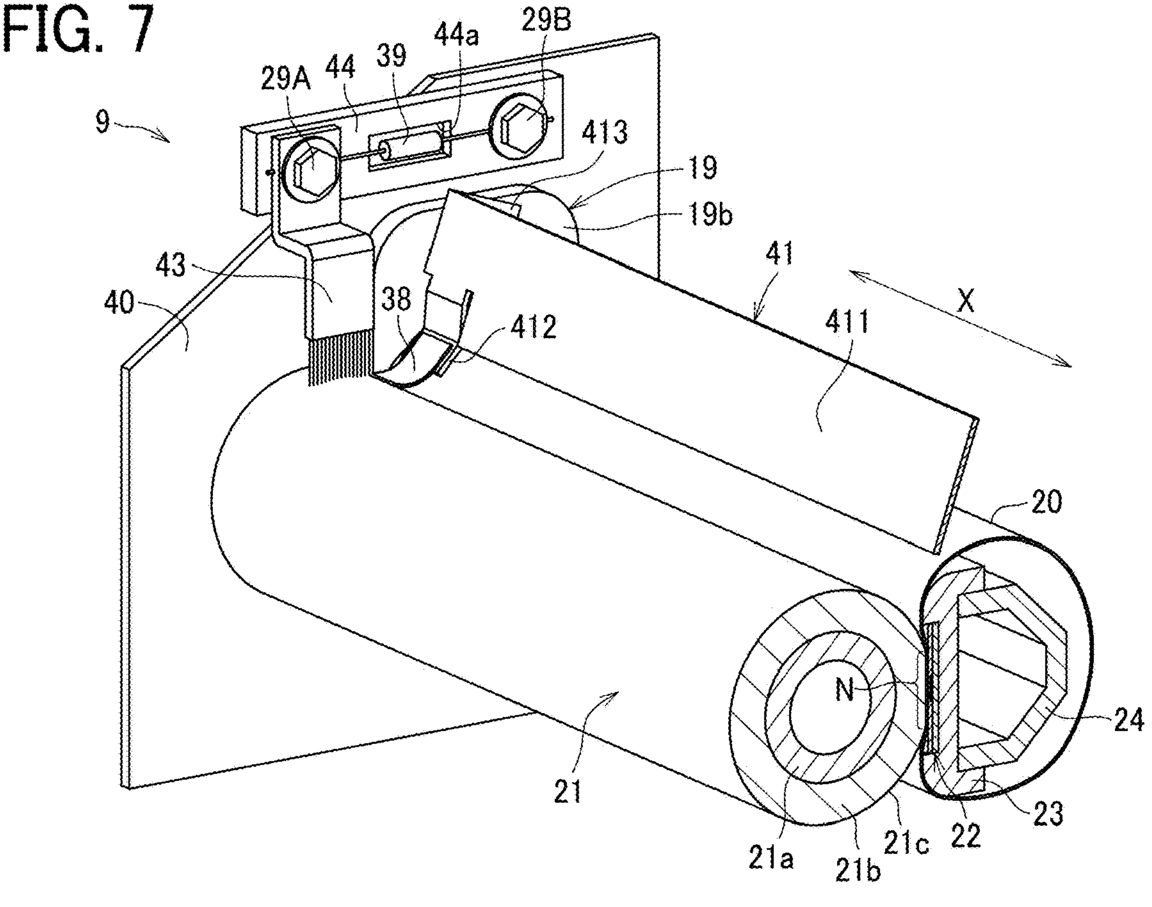
FIG. 7 is a perspective view of a part of the fixing device of FIG. 6 including the cross-sectional view of the rotators.

As illustrated in FIGS. 6 and 7, a grounding structure according to a second embodiment to ground the separation plate 41 and the pressure roller 21 includes a conductor 38 in addition to the discharging brush 43 and the resistor 39. The conductor 38 is a flexible sheet.

The conductor 38 having a sheet form is disposed so as to be in direct contact with both the abutment portion 412 of the separation plate 41 and the outer circumferential surface of the pressure roller 21. As a result, the separation plate 41 and the pressure roller 21 are electrically coupled to each other via the conductor 38. Since the discharging brush 43 is in direct contact with the outer circumferential surface of the pressure roller 21, the pressure roller 21 is electrically coupled to the side plate 40 via the discharging brush 43 and the resistor 39. The separation plate 41 is electrically coupled to the side plate 40 via the conductor 38, the discharging brush 43, and the resistor 39. Other configurations are the same as those of the above-described first embodiment.

The conductor 38 is made of a conductive material having an electric resistance value smaller than the electric resistance value of the support shaft 42 of the belt holder 19 supporting the separation plate 41 and the electric resistance value of the elastic layer 21*b* of the pressure roller 21. Therefore, the current appropriately flows from the separation plate 41 to the side plate 40 via the conductor 38, the discharging brush 43, and the resistor 39. In addition, the current also appropriately flows from the pressure roller 21 to the side plate 40 via the discharging brush 43 and the resistor 39.

The above-described resistor 39 in the second embodiment of the present disclosure secures the certain insulation resistance between the separation plate 41 and the side plate 40 and the certain insulation resistance between pressure roller 21 and the side plate 40 and couples the separation plate 41 and the pressure roller 21 to the ground. As a result, the fixing device according to the second embodiment can reduce the above-described variation in the amount of heat generated by the heater 22 due to electric leakage, the adverse effects caused by charging electronic components in the image forming apparatus, and the occurrence of the abnormal image such as the electronic offset.

In addition, similar to the above-described first embodiment, the grounding structure according to the second embodiment includes the one conductor 38, the one discharging brush 43, and the one resistor 39, which can reduce the size and cost of the fixing device. That is, the fixing device according to the second embodiment has the number of parts, the size, and the cost that are smaller than the fixing device including the separation plate 41 coupled to the ground via the conductor 38, the discharging brush 43, and the resistor 39 and the pressure roller 21 coupled to the ground via another conductor, another discharging brush, and another resistor. As illustrated in FIGS. 6 and 7, the conductor 38 in the second embodiment is disposed downstream from the nip N in the sheet conveyance direction and between the pressure roller 21 and the separation plate 41. As a result, the conductor 38 is close to the pressure roller 21 and the separation plate 41 that are objects from which the charge is removed, which reduces the size of the fixing device.

Preferably, a volume resistance of the conductor 38 is 110 kΩ or more. Setting the volume resistance of the conductor 38 to 110 kΩ or more limits the current flowing from the separation plate 41 and the pressure roller 21 to the side plate 40. As a result, setting the volumetric resistance of the conductor 38 to 110 kΩ or more can effectively reduce the variation in the amount of heat generated by the heater 22 due to electric leakage, the adverse effects caused by charging electronic components in the image forming apparatus, and the occurrence of the abnormal image such as the electronic offset.

Figure 8:
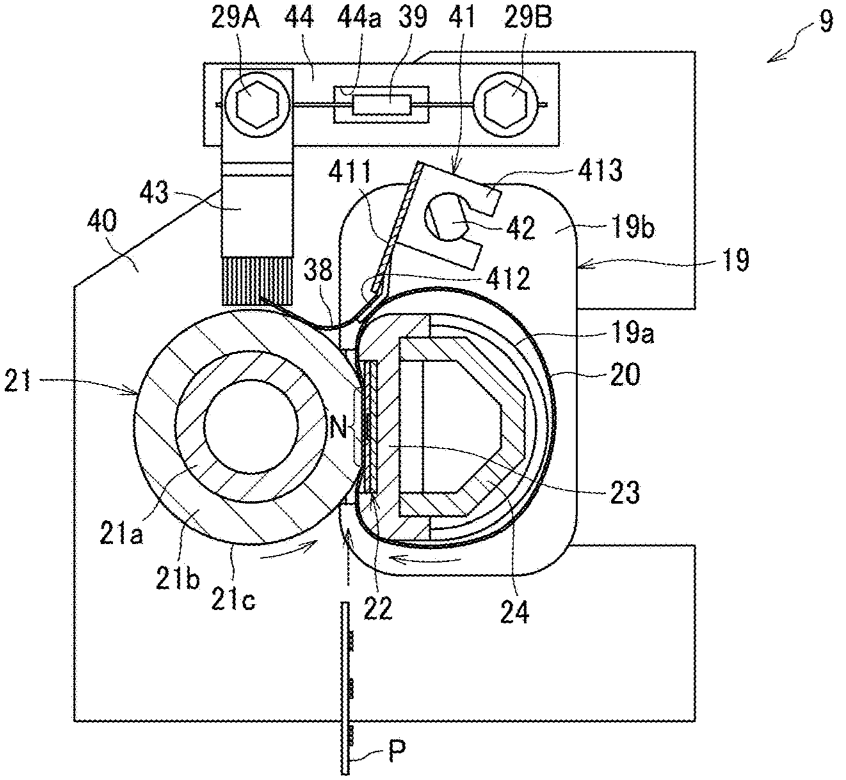
FIG. 8 is a vertical cross-sectional view of the fixing device according to a third embodiment of the present disclosure viewed from the lateral side of the fixing device.
Figure 9:
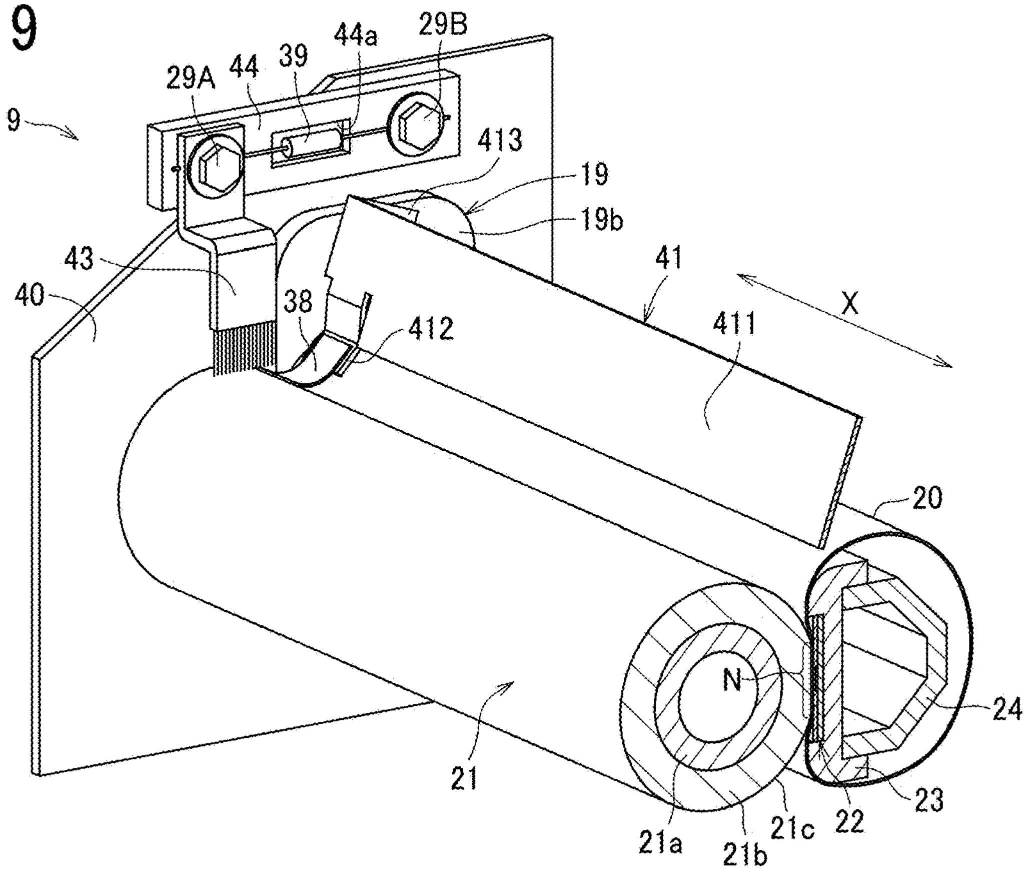
FIG. 9 is a perspective view of a part of the fixing device of FIG. 8 including the cross-sectional view of the rotators.

Next, a third embodiment of the present disclosure is described with reference to FIGS. 8 and 9. In the third embodiment, the conductor 38 is in direct contact with the discharging brush 43 in addition to the abutment portion 412 of the separation plate 41 and the outer circumferential surface of the pressure roller 21. As a result, the separation plate 41 and the pressure roller 21 are electrically coupled to the discharging brush 43 via the conductor 38.

Thus, the separation plate 41 and the pressure roller 21 in the third embodiment are electrically coupled to the side plate 40 via the conductor 38, the discharging brush 43, and the resistor 39. That is, the resistor 39 secures the certain insulation resistance between the separation plate 41 and the side plate 40 and the certain insulation resistance between pressure roller 21 and the side plate 40 and couples the separation plate 41 and the pressure roller 21 to the ground. The current in the third embodiment also appropriately flows from the separation plate 41 and pressure roller 21 to the side plate 40. As a result, the fixing device according to the third embodiment can reduce the above-described variation in the amount of heat generated by the heater 22 due to electric leakage, the adverse effects caused by charging electronic components in the image forming apparatus, and the occurrence of the abnormal image such as the electronic offset.

The grounding structure according to the third embodiment also includes the one conductor 38, the one discharging brush 43, and the one resistor 39, which can reduce the number of parts, the size, and the cost of the fixing. Similar to the above-described second embodiment, the conductor 38 is disposed between the pressure roller 21 and the separation plate 41 and downstream from the nip N in the sheet conveyance direction, which save a space and reduce the size of the fixing device.

Figure 10:
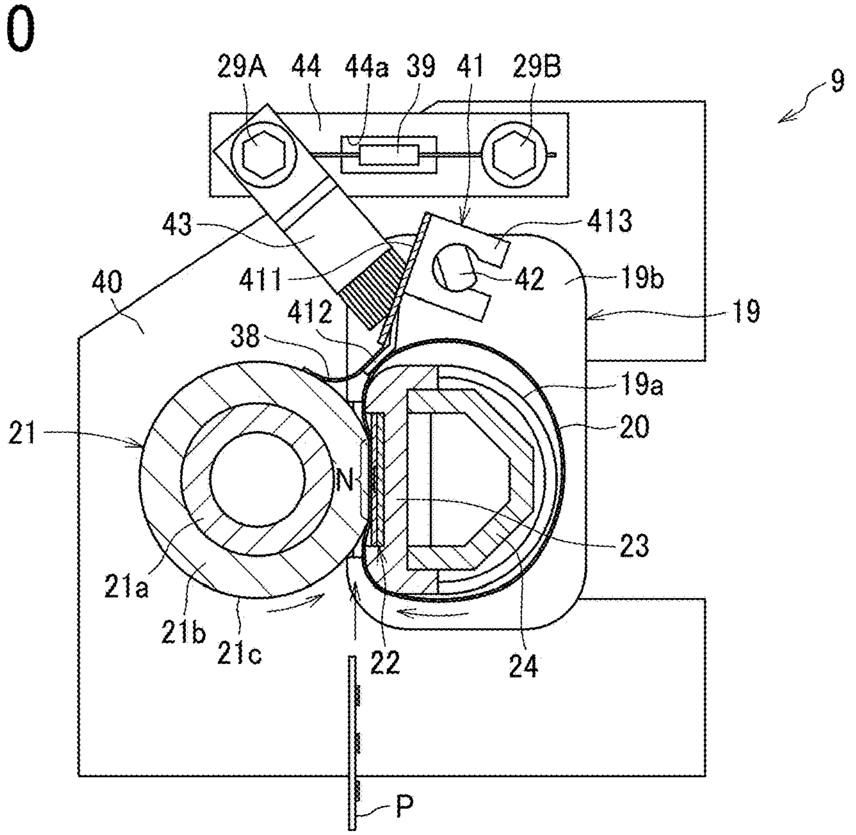
FIG. 10 is a vertical cross-sectional view of the fixing device according to a fourth embodiment of the present disclosure viewed from the lateral side of the fixing device.
Figure 11:
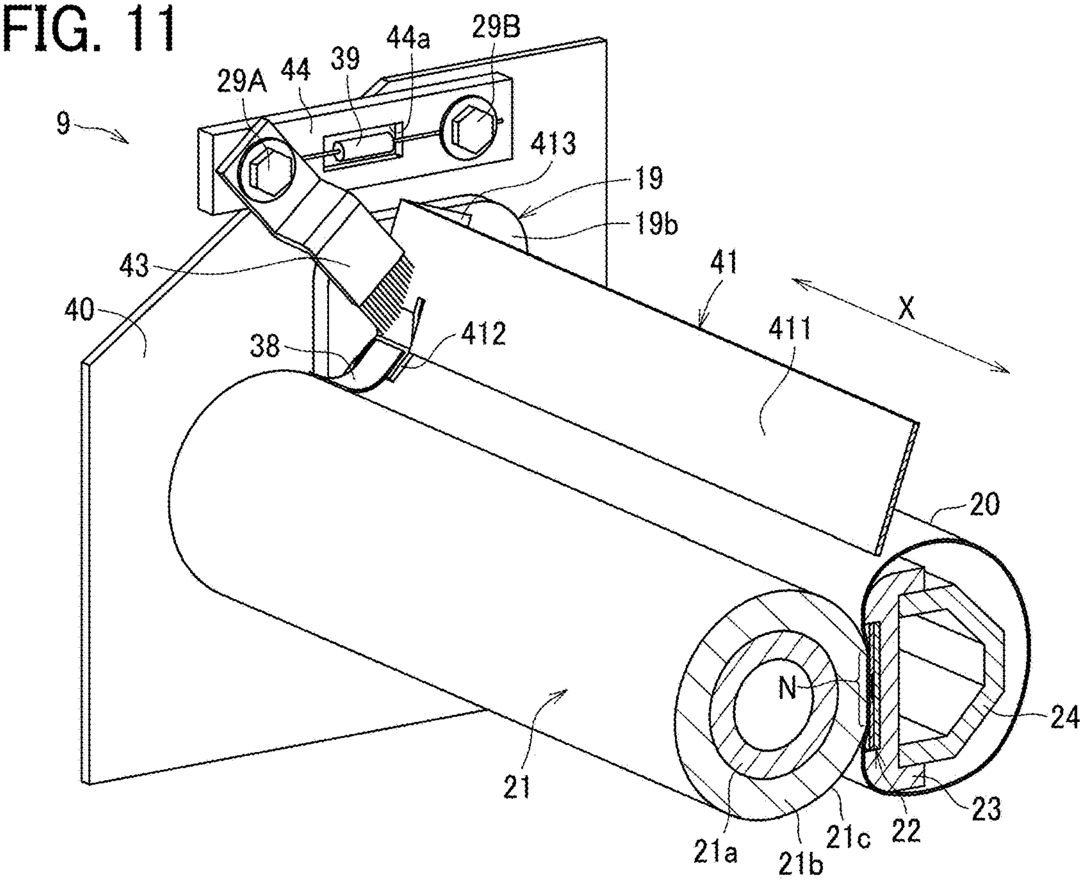
FIG. 11 is a perspective view of a part of the fixing device of FIG. 10 including the cross-sectional view of the rotators.

Next, a fourth embodiment of the present disclosure is described with reference to FIGS. 10 and 11. In the fourth embodiment, the conductor 38 is in direct contact with both the abutment portion 412 of the separation plate 41 and the outer circumferential surface of the pressure roller 21, and the discharging brush 43 is in direct contact with the separation portion 411 of the separation plate 41 The different point between the fourth embodiment and the second embodiment illustrated in FIGS. 6 and 7 is the above-described discharging brush 43 in direct contact with the separation plate 41. That is, in the second embodiment, the discharging brush 43 is in direct contact with the pressure roller 21 and not in direct contact with the separation plate 41 (see FIGS. 6 and 7). In contrast, the discharging brush 43 in the fourth embodiment is in direct contact with the separation plate 41 and not in direct contact with the pressure roller (see FIGS. 10 and 11).

Also in this case, the grounding structure configured by the fourth embodiment secures the certain insulation resistance between the separation plate 41 and the side plate 40 and the certain insulation resistance between the pressure roller 21 and the side plate 40, which is similar to the above-described embodiments. Accordingly, the current in the fourth embodiment also appropriately flows from the separation plate 41 and pressure roller 21 to the side plate 40. As a result, the fixing device according to the fourth embodiment can reduce the above-described variation in the amount of heat generated by the heater 22 due to electric leakage, the adverse effects caused by charging electronic components in the image forming apparatus, and the occurrence of the abnormal image such as the electronic offset.

The grounding structure according to the fourth embodiment also includes the one conductor 38, the one discharging brush 43, and the one resistor 39, which can reduce the number of parts, the size, and the cost of the fixing device. The conductor 38 disposed between the pressure roller 21 and the separation plate 41 and downstream from the nip N in the sheet conveyance direction can save a space and reduce the size of the fixing device.

Figure 12:
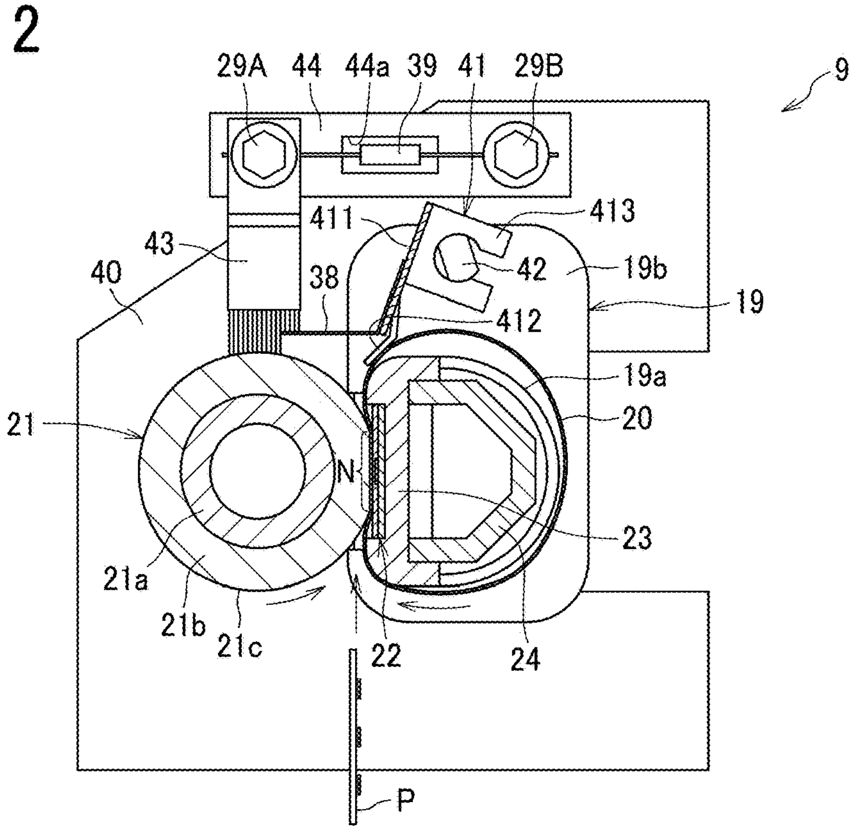
FIG. 12 is a vertical cross-sectional view of the fixing device according to a fifth embodiment of the present disclosure viewed from the lateral side of the fixing device.
Figure 13:
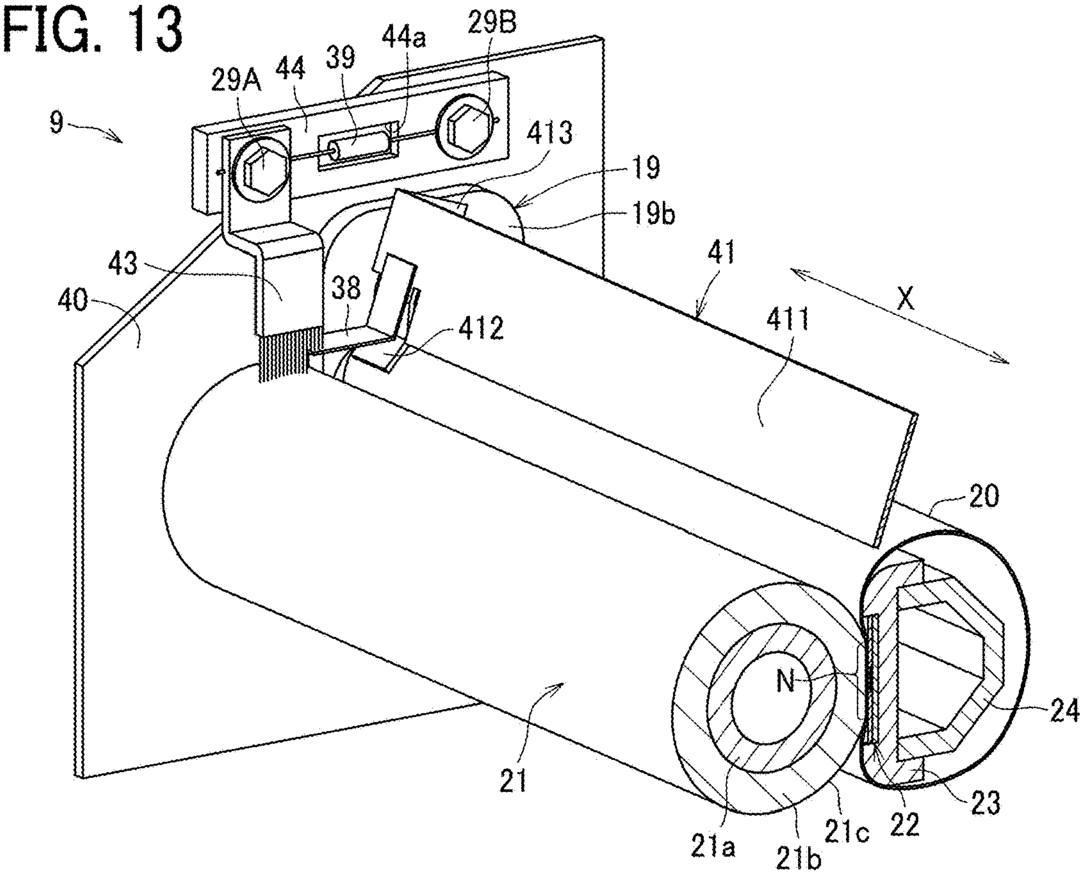
FIG. 13 is a perspective view of a part of the fixing device of FIG. 12 including the cross-sectional view of the rotators.

Next, a fifth embodiment of the present disclosure is described with reference to FIGS. 12 and 13. In the fifth embodiment, the conductor 38 is placed so as to be in direct contact with the separation portion 411 of the separation plate 41 and a brush portion of the discharging brush 43. On the other hand, the discharging brush 43 is in direct contact with the outer circumferential surface of the pressure roller 21 in addition to the conductor 38.

The conductor 38 in the fifth embodiment that is not in contact with the outer circumferential surface of the pressure roller 21 can avoid damage to the outer circumferential surface of the pressure roller 21 due to the contact of the conductor 38 and extend the life of the pressure roller 21. In addition, the conductor 38 in the fifth embodiment may be made of a member having high rigidity (in other words, having no flexibility). The conductor 38 in each of the other embodiments illustrated in FIGS. 6 to 11 that is in direct contact with the outer circumferential surface of the pressure roller 21 is preferably made of a conductive resin instead of a metal material in order to reduce damage to the outer circumferential surface of the pressure roller 21 due to contact of the conductor 38 with the outer circumferential surface of the pressure roller 21.

Thus, the separation plate 41 and the pressure roller 21 in the fifth embodiment are also electrically coupled to the side plate 40 via the conductor 38, the discharging brush 43, and the resistor 39. Therefore, the grounding structure configured by the fifth embodiment secures the certain insulation resistance between the separation plate 41 and the side plate 40 and the certain insulation resistance between the pressure roller 21 and the side plate 40. Accordingly, the current in the fifth embodiment also appropriately flows from the separation plate 41 and the pressure roller 21 to the side plate 40. As a result, the fixing device according to the fifth embodiment can reduce the above-described variation in the amount of heat generated by the heater 22 due to electric leakage, the adverse effects caused by charging electronic components in the image forming apparatus, and the occurrence of the abnormal image such as the electronic offset.

The grounding structure according to the fifth embodiment also includes the one conductor 38, the one discharging brush 43, and the one resistor 39, which can reduce the number of parts, the size, and the cost of the fixing device. The conductor 38 disposed between the pressure roller 21 and the separation plate 41 and downstream from the nip N in the sheet conveyance direction can save a space and reduce the size of the fixing device.

Figure 14:
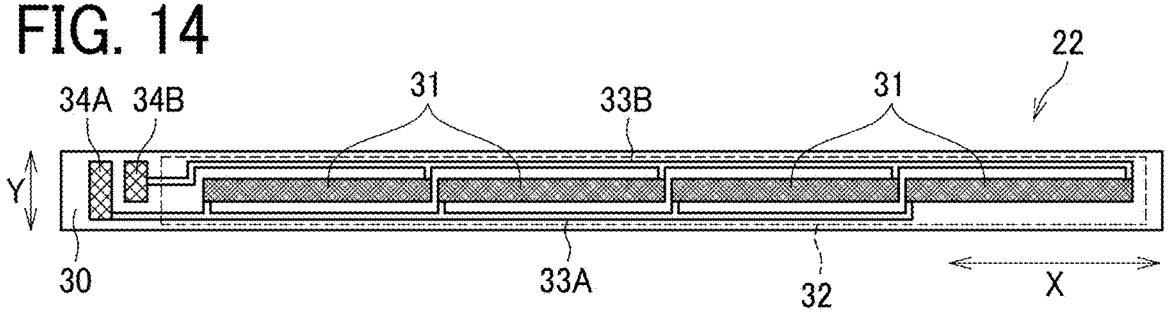
FIG. 14 is a plan view of a first variation of the heater.
Figure 15:
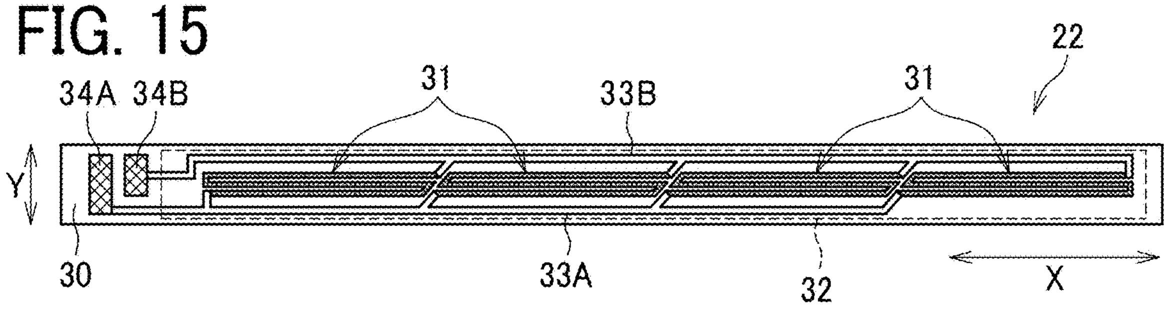
FIG. 15 is a plan view of a second variation of the heater.

Although embodiments of the present disclosure are described above, the present disclosure is not limited to those embodiments. For example, as illustrated in FIG. 14, the heater 22 may include resistive heat generators 31 each having a rectangular shape, or as illustrated in FIG. 15, the resistive heat generator 31 may be configured by a linear portion folding back to form a substantially parallelogram shape. In FIG. 14, portions each extending from the resistive heat generator 31 having the rectangular shape to one of the power supply lines 33A and 33B (the portion extending in the direction intersecting the arrangement direction Y) may be a part of the resistive heat generator 31 or may be made of the same material as the power supply lines 33A and 33B.

Figure 16:
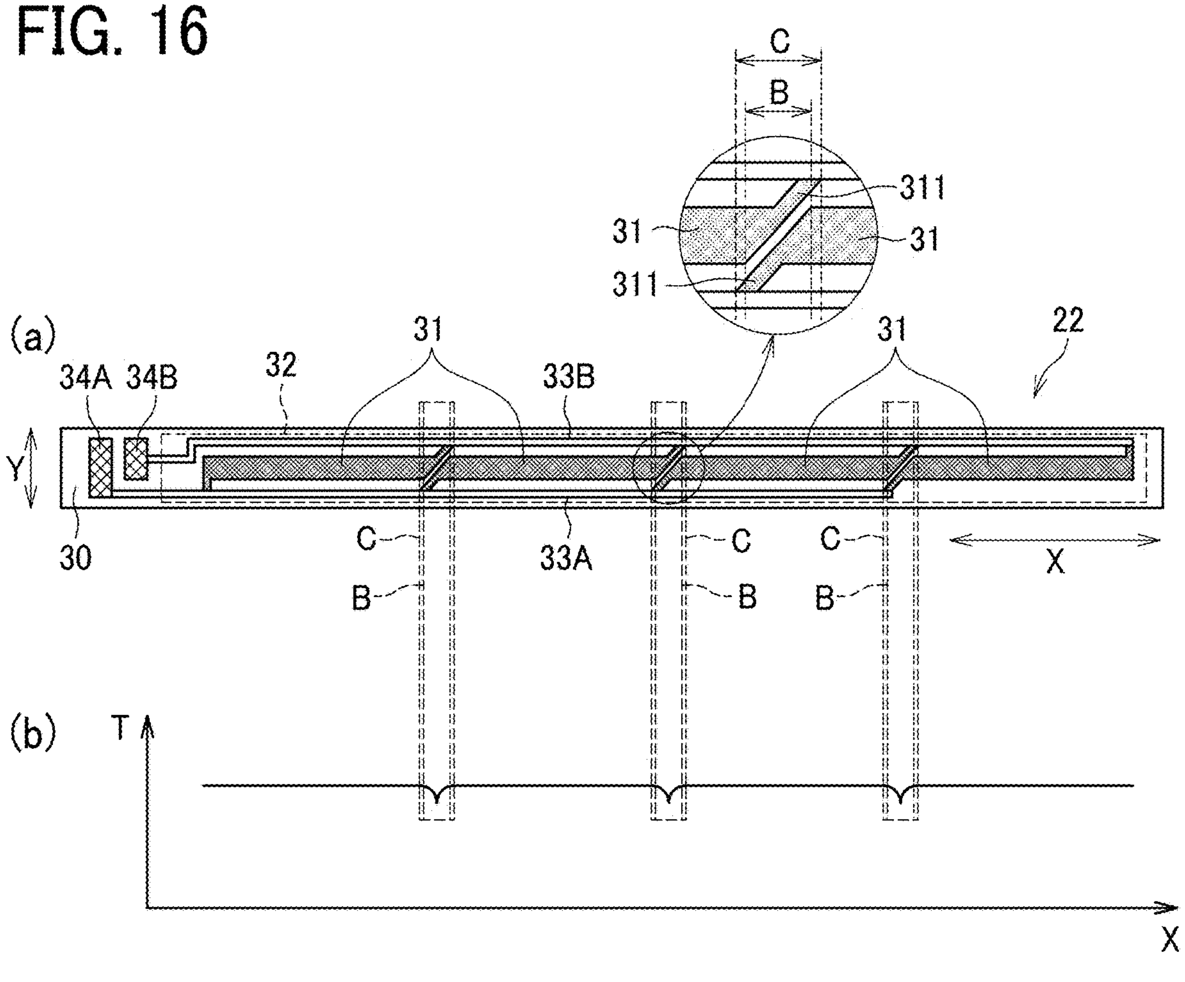
FIG. 16 is a plan view (a) of the heater including a plurality of resistive heat generators arranged at intervals in a longitudinal direction of the heater and a graph (b) illustrating a temperature distribution in the longitudinal direction of a fixing belt heated by the heater.

FIG. 16 is a plan view (a) of the heater including a plurality of resistive heat generators 31 arranged at intervals in a longitudinal direction of the heater 22 and a graph (b) illustrating a temperature distribution of the fixing belt 20 heated by the heater 22. FIG. 16(*a*) illustrates the arrangement of the resistive heat generators 31 on the heater 22. In the graph of FIG. 16(*b*), a vertical axis represents the temperature T of the fixing belt 20, and a horizontal axis represents the position of the fixing belt 20 in the longitudinal direction X.

As illustrated in FIG. 16, the plurality of resistive heat generators 31 of the heater 22 are separated from each other in the arrangement direction (that is the longitudinal direction X) to form separation areas B including gap areas between the neighboring resistive heat generators 31. In other words, the heater 22 has gap areas between the plurality of resistive heat generators 31. As illustrated in an enlarged view of FIG. 16(*a*), the separation area B includes the entire gap area sandwiched by the adjoining resistive heat generators 31. In addition, the separation area B includes parts of the resistive heat generators sandwiched between lines extending in a direction orthogonal to the longitudinal direction from both ends of the gap area in the longitudinal direction. The area occupied by the resistive heat generators 31 in the separation area B is smaller than the area occupied by the resistive heat generators 31 in another area of the heat generation portion 35, and the amount of heat generated in the separation area B is smaller than the amount of heat generated in another area of the heat generation portion. As a result, the temperature of the fixing belt 20 on the separation area B becomes smaller than the temperature of the fixing belt 20 on another area, which causes temperature unevenness in the arrangement direction of the fixing belt 20 as illustrated in FIG. 16(*b*). Similar to the separation area B, the temperature of the heater 22 on an enlarged separation area C that includes an area around the separation area B and the temperature of the fixing belt 20 on the enlarged separation area C are smaller than the temperatures of the heater 22 and the fixing belt 20 on another area of the heat generation portion 35. Similarly, the temperature of the heater 22 on the separation area B becomes smaller than the temperature of the heater 22 on another area of the heat generation portion 35. With reference to an enlarged partial view of FIG. 16(*a*), the separation area B is defined as an area in the arrangement direction including the entire gap area between the resistive heat generators 31 that are the main heat generation parts of the heater 22. In addition to the separation area B, the heater 22 has the enlarged separation area C including areas corresponding to connection portions 311 of the resistive heat generators 31 and the separation area B as illustrated in the enlarged view of FIG. 16(*a*). The connection portion 311 is defined as a portion of the resistive heat generator 31 that extends in the direction intersecting the arrangement direction and is connected to one of the power supply lines 33A and 33B.

Figure 17:
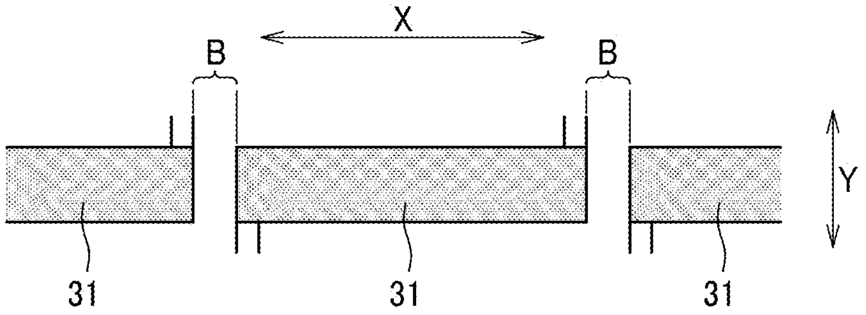
FIG. 17 is a diagram illustrating separation areas of the heater of FIG. 14.
Figure 18:
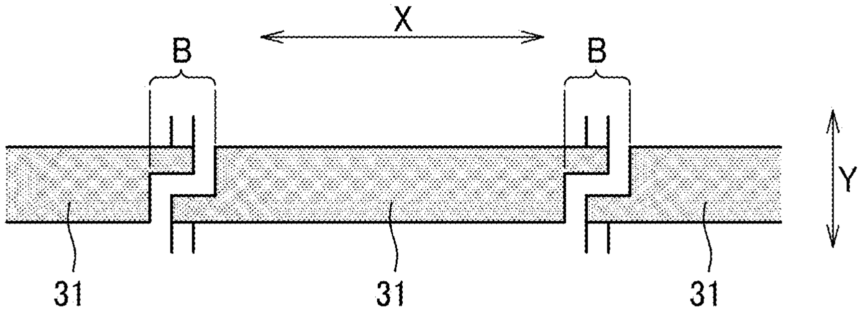
FIG. 18 is a diagram illustrating separation areas each having a form different from the form of the separation area of FIG. 17.
Figure 19:
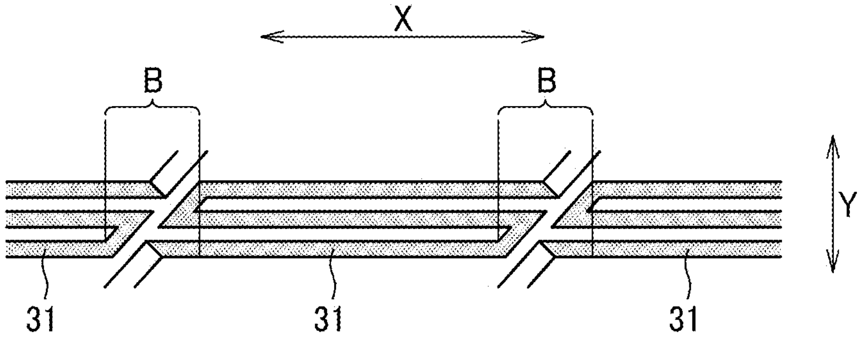
FIG. 19 is a diagram illustrating separation areas of the heater of FIG. 15.

As illustrated in FIG. 17, the heater 22 including the rectangular resistive heat generators 31 illustrated in FIG. 14 also has the separation areas B having lower temperatures than another area of the heat generation portion 35. In addition, the heater 22 including the resistive heat generators 31 having forms as illustrated in FIG. 18 has the separation areas B with lower temperatures than another area of the heat generation portion 35. As illustrated in FIG. 19, the heater 22 including the resistive heat generators 31 having forms as illustrated in FIG. 15 has the separation areas B with lower temperatures than another area of the heat generation portion 35. However, overlapping the resistive heat generators 31 lying next to each other in the arrangement direction (the direction indicated by an arrow X) as illustrated in FIGS. 16, 18, and 19 can reduce the above-described temperature drop that the temperature of the fixing belt 20 corresponding to the separation area B is smaller than the temperature of the fixing belt 20 corresponding to an area other than the separation area B.

Figure 20:
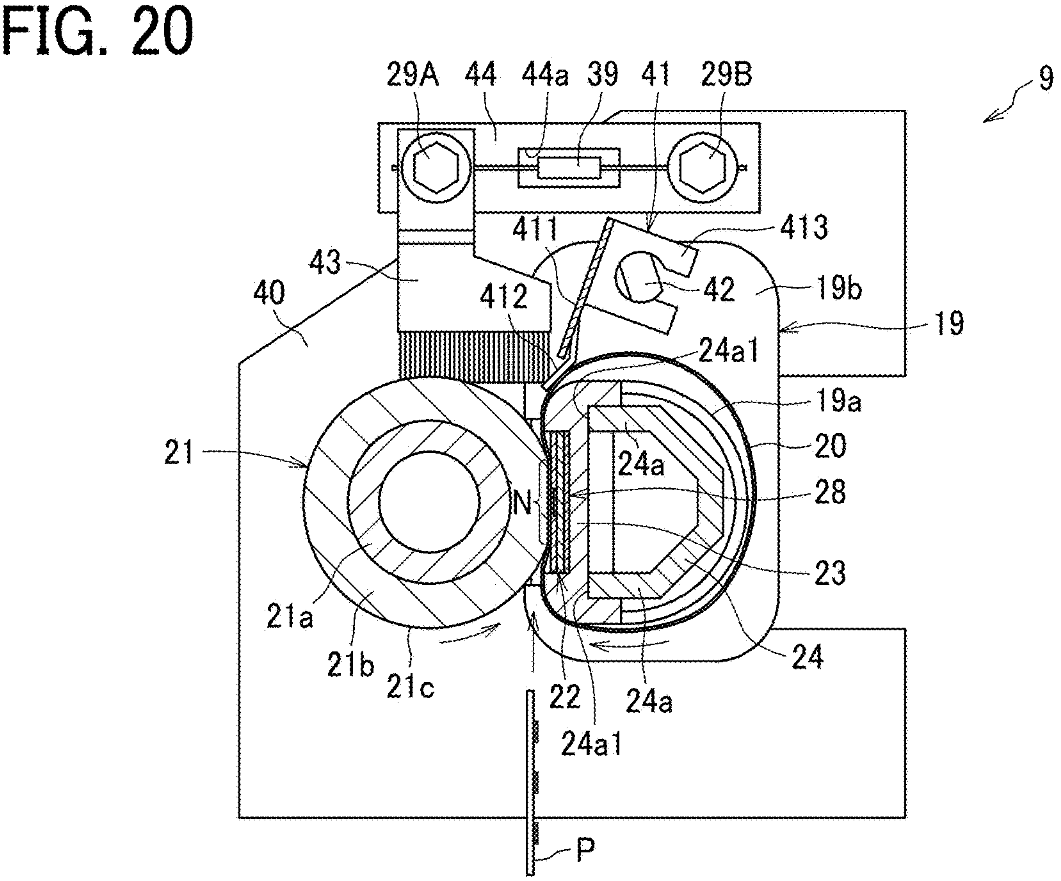
FIG. 20 is a vertical cross-sectional view of the fixing device viewed from the lateral side of the fixing device different from the above-described embodiments.

As illustrated in FIG. 20, the fixing device 9 according to the present embodiments may include a first high thermal conduction member 28 between the heater 22 and the heater holder 23.

The first high thermal conduction member 28 is made of a material having a thermal conductivity higher than a thermal conductivity of the base 30 of the heater 22. The first high thermal conduction member 28 is a plate made of aluminum, copper, silver, graphene, or graphite. The first high thermal conduction member 28 that is the plate can improve accuracy of positioning of the heater 22 with respect to the heater holder 23 and the first high thermal conduction member 28.

As illustrated in FIG. 20, the first high thermal conduction member 28 is disposed between the heater 22 and the stay 24 in the lateral direction of FIG. 20 and is particularly sandwiched between the heater 22 and the heater holder 23. That is, the first high thermal conduction member 28 is disposed so that one side of the first high thermal conduction member 28 is brought into contact with the back surface of the heater 22, and the other side of the first high thermal conduction member 28 is brought into contact with the heater holder 23.

The stay 24 has two rectangular portions 24*a* extending in a thickness direction of the heater 22 and each having a contact surface 24*al* that contacts the back side of the heater holder 23 to support the heater holder 23, the first high thermal conduction member 28, and the heater 22. In the direction intersecting the arrangement direction that is the vertical direction in FIG. 2, the contact surfaces 24*a*1 face regions outside the resistive heat generators 31. The above-described structure reduces heat transfer from the heater 22 to the stay 24 and enables the heater 22 to effectively heat the fixing belt 20.

In order to calculate the thermal conductivity of the first high thermal conduction member 28 or the like, the thermal diffusivity of a target object is firstly measured. Using the thermal diffusivity, the thermal conductivity is calculated. The thermal diffusivity is measured using a thermal diffusivity/conductivity measuring device (for example, trade name: AI-PHASE MOBILE 1U, manufactured by Ai-Phase co., ltd.).

In order to convert the thermal diffusivity into thermal conductivity, values of density and specific heat capacity are necessary. The density is measured using a dry automatic densitometer (for example, trade name: Accupyc 1330, manufactured by Shimadzu Corporation). The specific heat capacity is measured by a differential scanning calorimeter (for example, trade name: DSC-60 manufactured by Shimazu Corporation), and sapphire is used as a reference material in which the specific heat capacity is known. For example, the specific heat capacity is measured five times, and an average value at 50° C. is used. The thermal conductivity λ is obtained by the following expression (1).

Expression 1

$$\lambda=\rho\times C\times\alpha. \quad (1)$$

where ρ is the density, C is the specific heat capacity, and α is the thermal diffusivity obtained by the thermal diffusivity measurement described above.

Next, a detailed description is given of the first high thermal conduction member 28.

Figure 21:
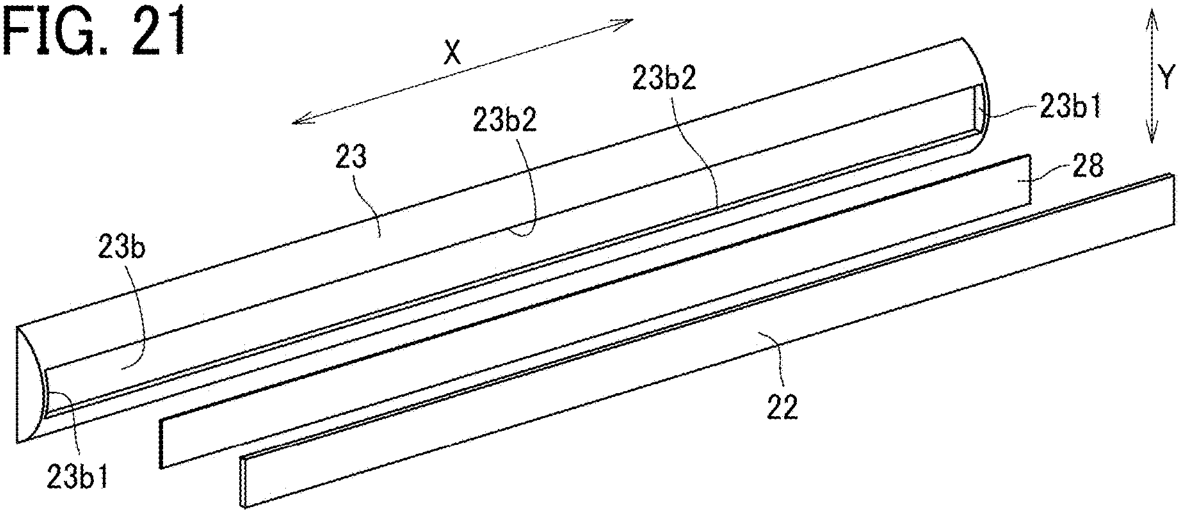
FIG. 21 is an exploded perspective view of a heater, a first high thermal conduction member, and a heater holder that are illustrated in FIG. 20.

As illustrated in FIG. 21, the first high thermal conduction member 28 is a plate having a thickness of 0.3 mm, a length of 222 mm in the arrangement direction, and a width of 10 mm in the direction intersecting the arrangement direction. The first high thermal conduction member 28 may be a single plate or may be made of a plurality of members.

As illustrated in FIG. 21, the first high thermal conduction member 28 is fitted into the recessed portion 23*b* of the heater holder 23, and the heater 22 is mounted thereon. Thus, the first high thermal conduction member 28 is sandwiched and held between the heater holder 23 and the heater 22. In FIG. 21, the length of the first high thermal conduction member 28 in the arrangement direction is substantially the same as the length of the heater 22 in the arrangement direction. Both side walls 23*b*2 forming the recessed portion 23*b* and being away from each other in the direction intersecting the arrangement direction restricts movement of the heater 22 and movement of the first high thermal conduction member 28 in the direction intersecting the arrangement direction and serves as a movement restricting portion in the direction intersecting the arrangement direction. Both side walls 23*b*1 forming the recessed portion 23*b* and being away from each other in the arrangement direction restricts movement of the heater 22 and movement of the first high thermal conduction member 28 in the arrangement direction and serves as a movement restricting portion in the arrangement direction. Reducing the positional deviation of the first high thermal conduction member 28 in the arrangement direction in the fixing device 9 improves the thermal conductivity efficiency with respect to a target range in the arrangement direction.

Figure 22:
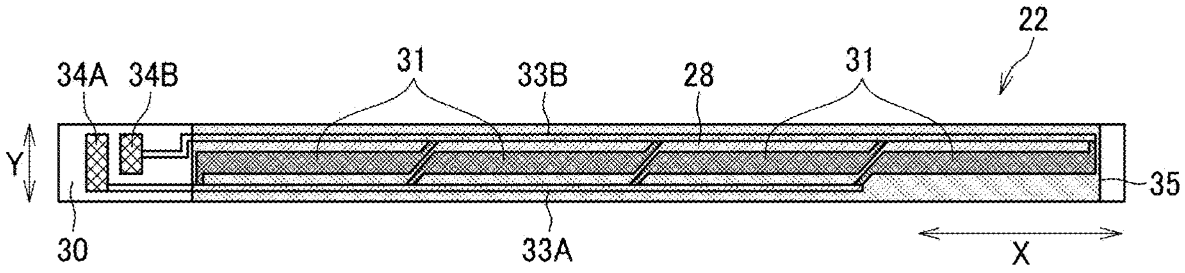
FIG. 22 is a plan view of the heater to illustrate a setting of the first high thermal conduction member.
Figure 23:
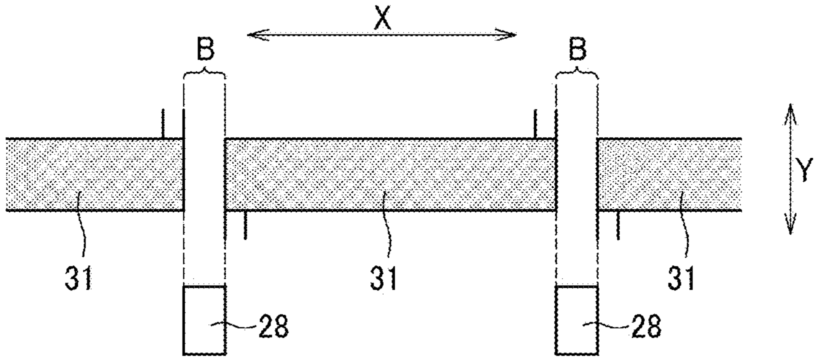
FIG. 23 is a diagram illustrating another example of the setting of the first high thermal conduction members in the heater.

The range in which the first high thermal conduction member 28 is disposed in the arrangement direction is not limited to the above. For example, as illustrated in FIG. 22, the first high thermal conduction member 28 may be disposed so as to face a range corresponding to the heat generation portion 35 in the arrangement direction (see a hatched portion in FIG. 22). As illustrated in FIG. 23, the first high thermal conduction member 28 may be disposed to cover the entire gap area between the resistive heat generators 31 and not to face the resistive heat generator. In FIG. 23, for the sake of convenience, the resistive heat generator 31 and the first high thermal conduction member 28 are shifted in the vertical direction of FIG. 23 but are disposed at substantially the same position in the direction intersecting the arrangement direction. However, the present disclosure is not limited to the above. The first high thermal conduction member 28 may be disposed to face a part of the resistive heat generators 31 in the direction intersecting the arrangement direction or may be disposed so as to cover the entire resistive heat generators 31 in the direction intersecting the arrangement direction as illustrated in FIG. 24, which is described below.

Figure 24:
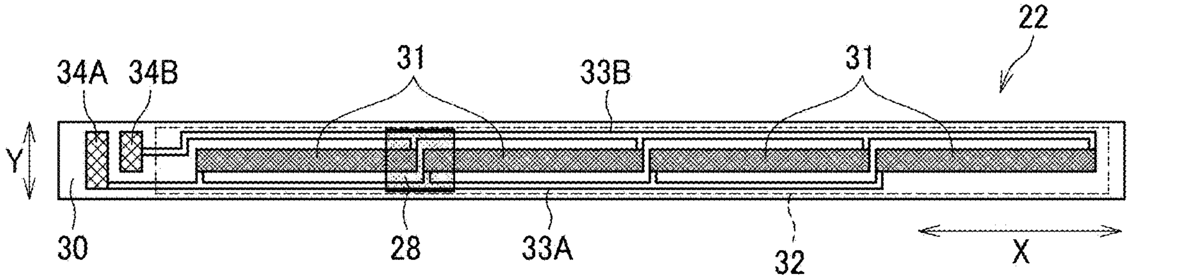
FIG. 24 is a plan view of the heater to illustrate still another example of the setting of the first high thermal conduction member.

As illustrated in FIG. 24, the first high thermal conduction member 28 may face a part of each of the neighboring resistive heat generators 31 in addition to the gap area between the neighboring resistive heat generators 31. The first high thermal conduction member 28 may be disposed to face all separation areas B in the heater 22, one separation area B as illustrated in FIG. 24, or some of separation areas B. At least a part of the first high thermal conduction member 28 may be disposed to face the separation area B.

Due to the pressing force of the pressure roller 21, the first high thermal conduction member 28 is sandwiched between the heater 22 and the heater holder 23 and is brought into close contact with the heater 22 and the heater holder 23. Bringing the first high thermal conduction member 28 into contact with the heaters 22 improves the heat conduction efficiency of the heaters 22 in the arrangement direction. The first high thermal conduction member 28 facing the separation area B improves the heat conduction efficiency of a part of the heater 22 facing the separation area B in the arrangement direction, transmits heat to the part of the heater 22 facing the separation area B, and raises the temperature of the part of the heater 22 facing the separation area B.

As a result, the first high thermal conduction member 28 reduces the temperature unevenness in the arrangement direction of the heaters 22. Thus, temperature unevenness in the arrangement direction of the fixing belt 20 is reduced. Therefore, the above-described structure reduces fixing unevenness and gloss unevenness in the image fixed on the sheet. Since the heater 22 does not need to generate additional heat to secure sufficient fixing performance in the part of the heater 22 facing the separation area B, energy consumption of the fixing device 9 can be saved. The first high thermal conduction member 28 disposed over the entire area of the heat generation portion 35 in the arrangement direction improves the heat transfer efficiency of the heater 22 over the entire area of a main heating region of the heater 22 (that is, an area facing an image formation area of the sheet passing through the fixing device) and reduces the temperature unevenness of the heater 22 and the temperature unevenness of the fixing belt 20 in the arrangement direction.

The combination of the first high thermal conduction member 28 and the resistive heat generator 31 having the PTC characteristic described above efficiently reduces overheating the non-sheet passing region (that is the region of the fixing belt not in contact with the small sheet) of the fixing belt 20 when small sheets pass through the fixing device 9. Specifically, the PTC characteristic reduces the amount of heat generated by the resistive heat generator 31 facing the non-sheet passing region, and the first high thermal conduction member effectively transfers heat from the non-sheet passing region in which the temperature rises to a sheet passing region that is a region of the fixing belt contacting the sheet. As a result, the overheating of the non-sheet passing region is effectively mitigated.

The first high thermal conduction member 28 may be disposed opposite an area around the separation area B because the small heat generation amount in the separation area B decreases the temperature in the area around the separation area B. For example, the first high thermal conduction member 28 facing the enlarged separation area C (see FIG. 16(*a*)) particularly improves the heat transfer efficiency of the separation area B and the area around the separation area B in the arrangement direction and reduces the temperature unevenness of the heater 22 in the arrangement direction. The first high thermal conduction member 28 facing the entire region of the heat generation portion 35 in the arrangement direction reduces the temperature unevenness of the heater 22 (and the fixing belt 20) in the arrangement direction.

The fixing device according to the embodiments of the present disclosure may have the following structure.

Figure 25:
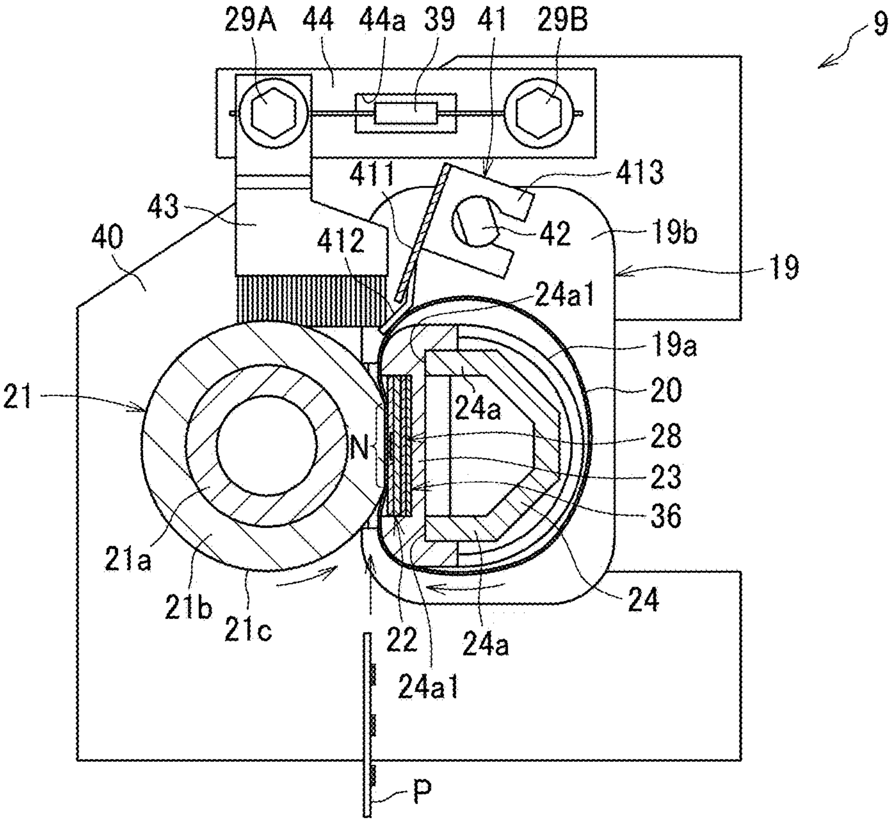
FIG. 25 is a vertical cross-sectional view of the fixing device viewed from the lateral side of the fixing device different from the above-described embodiments.

The fixing device 9 illustrated in FIG. 25 includes a second high thermal conduction member 36 between the heater holder 23 and the first high thermal conduction member 28. The second high thermal conduction member 36 is disposed so as to overlap the first high thermal conduction member 28 in the lateral direction in FIG. 25 that is a direction in which the heater holder 23, the stay 24, and the first high thermal conduction member 28 are layered.

The second high thermal conduction member 36 is made of a material having thermal conductivity higher than the thermal conductivity of the base 30 of the heater 22, for example, graphene or graphite. For example, the second high thermal conduction member 36 is made of a graphite sheet having a thickness of 1 mm. Alternatively, the second high thermal conduction member 36 may be a plate made of aluminum, copper, silver, or the like.

Figure 26:
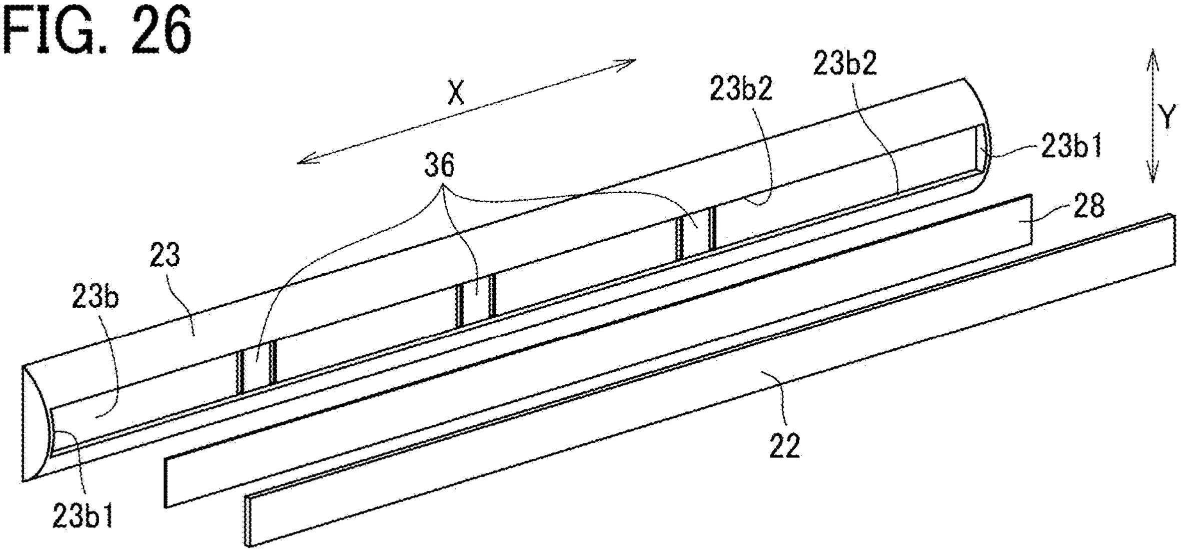
FIG. 26 is an exploded perspective view of the heater, the first high thermal conduction member, a second high thermal conduction member, and the heater holder that are illustrated in FIG. 25.

As illustrated in FIG. 26, a plurality of the second high thermal conduction members 36 are disposed on a plurality of portions of the heater holder 23 in the arrangement direction (the direction indicated by the arrow X). The recessed portion **23*b* of the heater holder 23 has a plurality of holes in which the second high thermal conduction members 36 are disposed. Clearances are formed between the heater holder 23 and both sides of the second high thermal conduction member 36 in the arrangement direction. The clearance prevents heat transfer from the second high thermal conduction member 36 to the heater holder 23, and the heater 22 can efficiently heat the fixing belt 20**.

Figure 27:
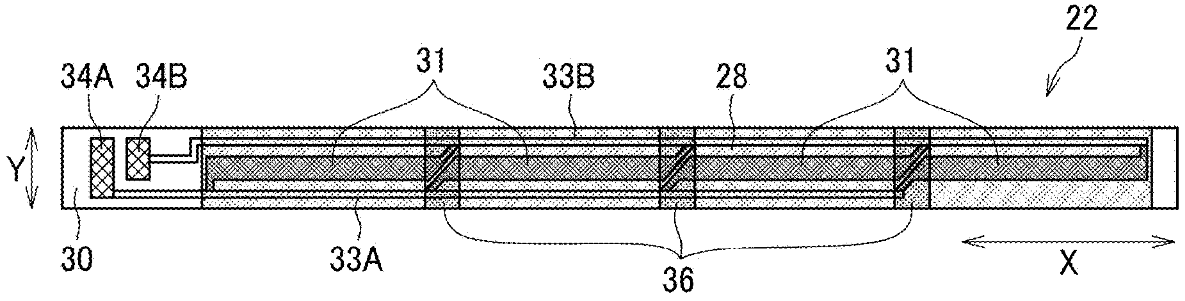
FIG. 27 is a plan view of the heater to illustrate a setting of the second high thermal conduction member on the first high thermal conduction member.

As illustrated in FIG. 27, each of the second high thermal conduction members 36 (see hatched portions) is disposed at a position corresponding to the separation area B in the arrangement direction (the direction indicated by the arrow X) and faces at least a part of each of the neighboring resistive heat generators 31 in the arrangement direction. In particular, each of the second high thermal conduction members 36 in this example faces the entire separation area B. In the example illustrated in FIG. 27 (and an example illustrated in FIG. 31 to be described later), the first high thermal conduction member 28 faces the heat generation portion 35 extending in the arrangement direction, but how to place the first high thermal conduction member 28 is not limited this.

Figure 28:
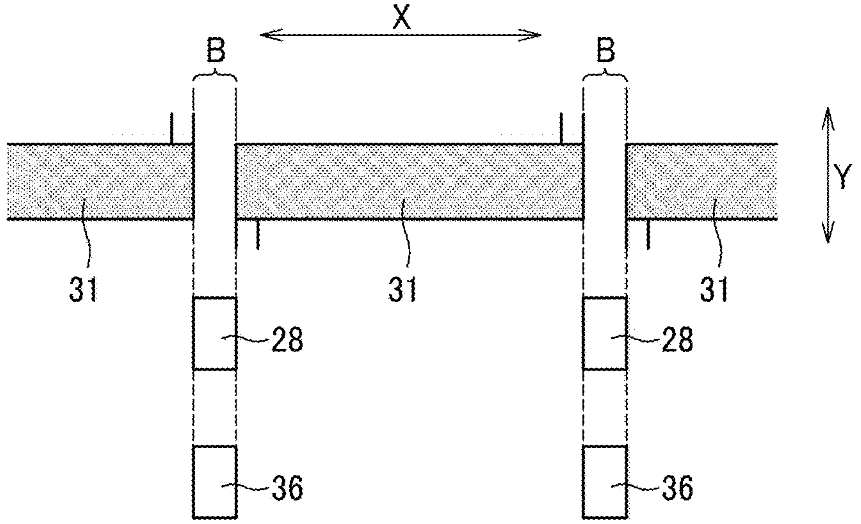
FIG. 28 is a diagram illustrating another example of the setting of the first high thermal conduction members and the second high thermal conduction members.

As illustrated in FIG. 27, the fixing device 9 includes the second high thermal conduction member 36 disposed at the position corresponding to the separation area B in the arrangement direction and the position at which at least a part of each of the neighboring resistive heat generators 31 faces the second high thermal conduction member 36 in addition to the first high thermal conduction member 28. The above-described structure particularly improves the heat transfer efficiency in the separation area B in the arrangement direction and further reduces the temperature unevenness of the heater 22 in the arrangement direction. As illustrated in FIG. 28, the first high thermal conduction members 28 and the second high thermal conduction member 36 may be disposed opposite the entire gap area between resistive heat generators 56. The above-described structure improves the heat transfer efficiency of the part of the heater 22 corresponding to the gap area to be higher than the heat transfer efficiency of the other part of the heater 22. In FIG. 28, for the sake of convenience, the resistive heat generator 31, the first high thermal conduction member 28, and the second high thermal conduction member 36 are shifted in the vertical direction of FIG. 28 but are disposed at substantially the same position in the direction intersecting the arrangement direction. However, the present disclosure is not limited to the above. The first high thermal conduction member 28 and the second high thermal conduction member 36 may be disposed opposite a part of the resistive heat generators 31 in the direction Y intersecting the arrangement direction or may be disposed so as to cover the entire resistive heat generators 31 in the direction Y intersecting the arrangement direction.

The first high thermal conduction member 28 and the second high thermal conduction member 36 made of the graphene sheet have high thermal conductivity in a predetermined direction along the plane of the graphene, that is, not in the thickness direction but in the arrangement direction. Accordingly, the above-described structure can effectively reduce the temperature unevenness of the fixing belt 20 in the longitudinal direction X (that is, the arrangement direction) and the temperature unevenness of the heater 22 in the longitudinal direction X (that is, the arrangement direction).

Figure 29:
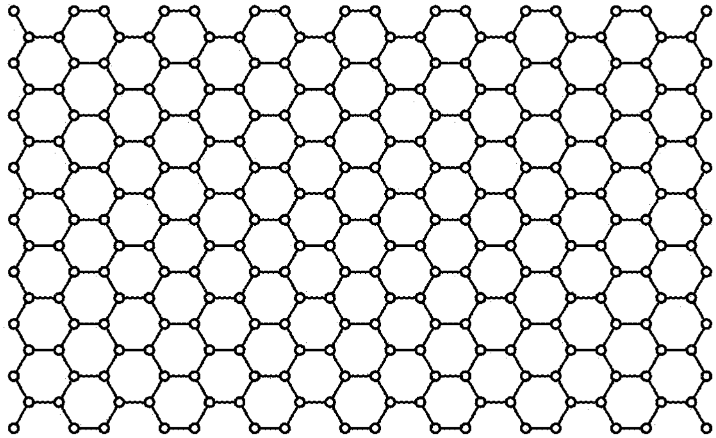
FIG. 29 is a schematic diagram illustrating a two dimensional atomic crystal structure of graphene.

Graphene is a flaky powder. Graphene has a planar hexagonal lattice structure of carbon atoms, as illustrated in FIG. 29. The graphene sheet is usually a single layer. The single layer of carbon may contain impurities. The graphene may have a fullerene structure. The fullerene structures are generally recognized as compounds including an even number of carbon atoms, which form a cage-like fused ring polycyclic system with five and six membered rings, including, for example, C60, C70, and C80 fullerenes or other closed cage structures having three-coordinate carbon atoms.

Graphene sheets are artificially made by, for example, a chemical vapor deposition (CVD) method.

The graphene sheet is commercially available. The size and thickness of the graphene sheet or the number of layers of the graphite sheet described below are measured by, for example, a transmission electron microscope (TEM).

Figure 30:
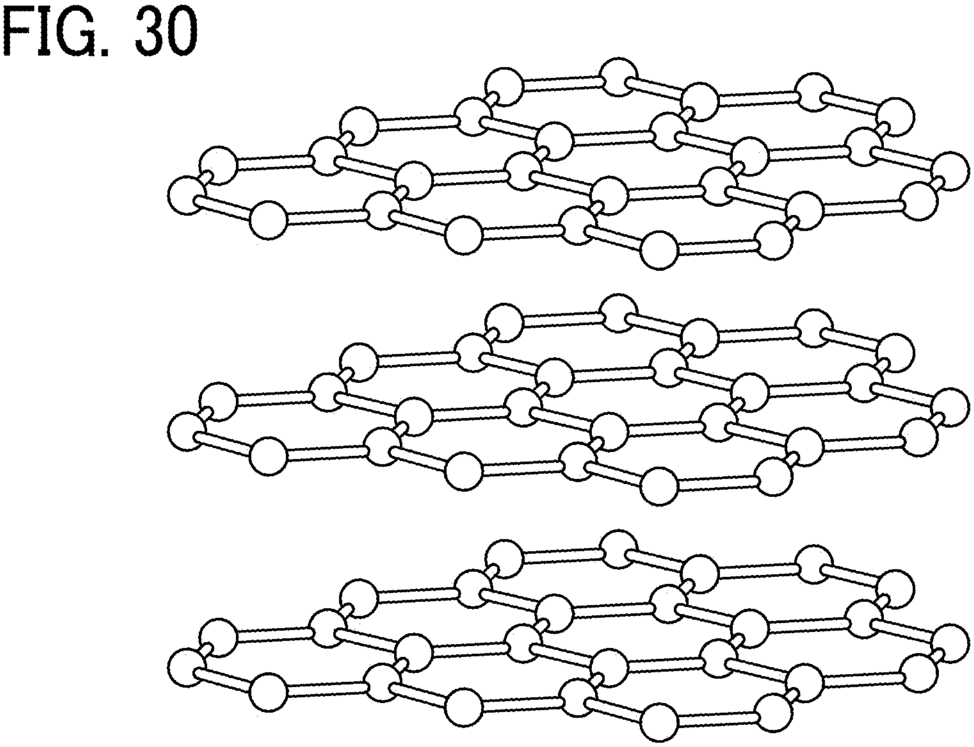
FIG. 30 is a schematic diagram illustrating a three dimensional atomic crystal structure of graphite.

Graphite obtained by multilayering graphene has a large thermal conduction anisotropy. As illustrated in FIG. 30, the graphite has a crystal structure formed by layering a number of layers each having a condensed six membered ring layer plane of carbon atoms extending in a planar shape. Among carbon atoms in this crystal structure, adjacent carbon atoms in the layer are coupled by a covalent bond, and carbon atoms between layers are coupled by a van der Waals bond. The covalent bond has a larger bonding force than a van der Waals bond. Therefore, there is a large anisotropy between the bond between carbon atoms in a layer and the bond between carbon atoms in different layers. In other words, the first high thermal conduction member 28 and the second high thermal conduction member 36 that are made of graphite each have the heat transfer efficiency in the arrangement direction larger than the heat transfer efficiency in the thickness direction of the first high thermal conduction member 28 and the second high thermal conduction member 36 (that is, the stacking direction of these members), reducing the heat transferred to the heater holder 23. Accordingly, the above-described structure can efficiently decrease the temperature unevenness of the heater 22 in the arrangement direction and can minimize the heat transferred to the heater holder 23. Since the first high thermal conduction member 28 and the second high thermal conduction member 36 that are made of graphite are not oxidized at about 700 degrees or lower, the first high thermal conduction member 28 and the second high thermal conduction member 36 each have an excellent heat resistance.

The physical properties and dimensions of the graphite sheet may be appropriately changed according to the function required for the first high thermal conduction member 28 or the second high thermal conduction member 36. For example, the anisotropy of the thermal conduction can be increased by using high-purity graphite or single-crystal graphite or increasing the thickness of the graphite sheet. Using a thin graphite sheet can reduce the thermal capacity of the fixing device 9 so that the fixing device 9 can perform high speed printing. A width of the first high thermal conduction member 28 or a width of the second high thermal conduction member 36 in the direction intersecting the arrangement direction may be increased in response to a large width of the fixing nip N or a large width of the heater 22.

From the viewpoint of increasing mechanical strength, the number of layers of the graphite sheet is preferably 11 or more. The graphite sheet may partially include a single layer portion and a multilayer portion.

Figure 31:
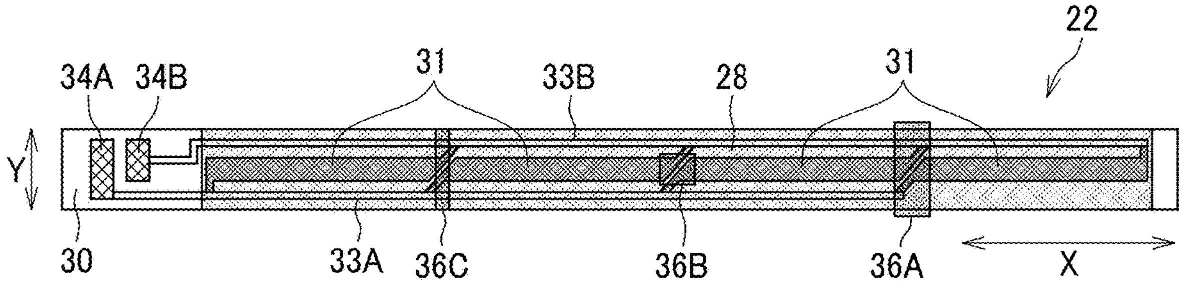
FIG. 31 is a plan view of the heater to illustrate still another example of the setting of the second high thermal conduction member.

As long as the second high thermal conduction member 36 faces a part of each of neighboring resistive heat generators 31 and at least a part of the gap area between the neighboring resistive heat generators 31, the configuration of the second high thermal conduction member 36 is not limited to the configuration illustrated in FIG. 27. For example, as illustrated in FIG. 31, a second high thermal conduction member 36A is longer than the base 30 in the direction intersecting the arrangement direction, and both ends of the second high thermal conduction member 36A in the direction intersecting the arrangement direction are outside the base 30 in FIG. 31. A second high thermal conduction member 36B faces a range in which the resistive heat generator 31 is disposed in the direction Y intersecting the arrangement direction. A second high thermal conduction member 36C faces a part of the gap area and a part of each of neighboring resistive heat generators 31 as illustrated in FIG. 31.

Figure 32:
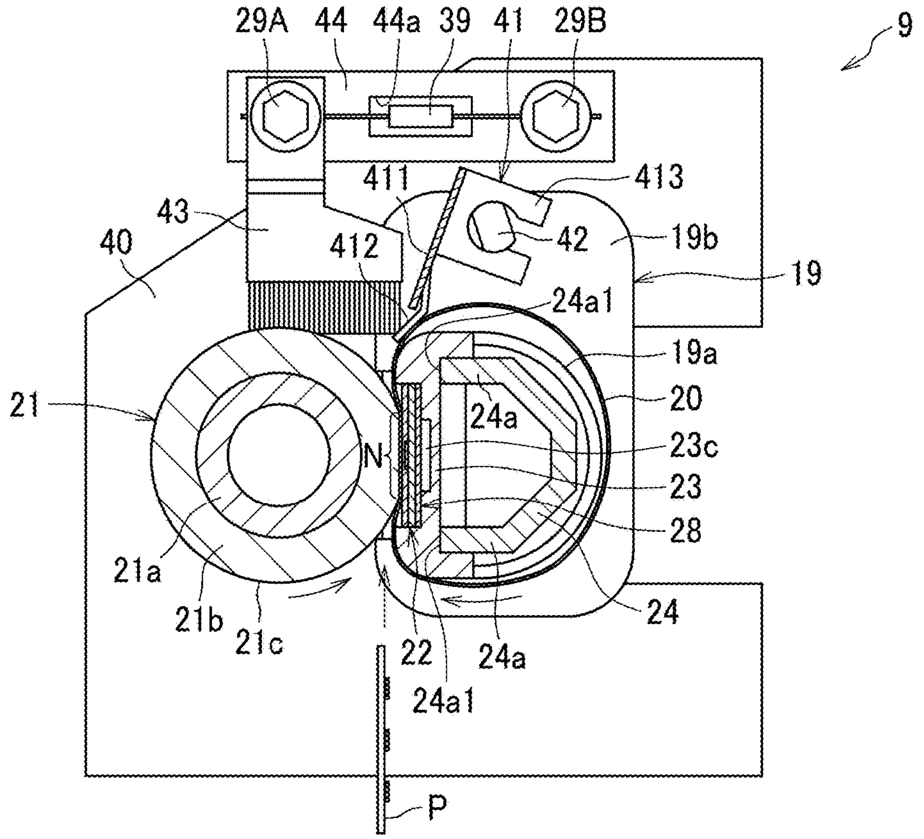
FIG. 32 is a vertical cross-sectional view of the fixing device viewed from the lateral side of the fixing device different from the above-described embodiments.

As illustrated in FIG. 32, the fixing device 9 may have a gap 23*c* between the first high thermal conduction member 28 and the heater holder 23 in the thickness direction that is the lateral direction in FIG. 32. In other words, the fixing device 9 has the gap 23*c* serving as a thermal insulation layer. In the arrangement direction, the gap 23*c* is in a portion included in the recessed portion 23*b* (see FIG. 26) in the heater holder 23 to set the first high thermal conduction member 28 and the second high thermal conduction member 36, but the second high thermal conduction member 36 is not set in the portion of the gap 23*c*. In the direction intersecting the arrangement direction, the gap 23*c* is in a portion of the recessed portion 23*b* having a depth deeper than other portions to receive the first high thermal conduction member 28. The above-described structure minimizes the contact area between the heater holder 23 and the first high thermal conduction member 28. Minimizing the contact area reduces heat transfer from the first high thermal conduction member 28 to the heater holder 23 and enables the heater 22 to efficiently heat the fixing belt 20. In the cross section of the fixing device 9 in which the second high thermal conduction member 36 is set in the direction intersecting the arrangement direction, the second high thermal conduction member 36 is in contact with the heater holder 23 as illustrated in FIG. 25.

In addition, as illustrated in FIG. 32, the fixing device 9 has the gap 23*c* facing the entire area of the resistive heat generators 31 in the direction intersecting the arrangement direction that is the vertical direction in FIG. 32. The gap 23*c* prevents heat transfer from the first high thermal conduction member 28 to the heater holder 23, and the heater 22 can efficiently heat the fixing belt 20. The fixing device may include a thermal insulation layer made of heat insulator having a lower thermal conductivity than the thermal conductivity of the heater holder 23 instead of a space like the gap 23*c* serving as the thermal insulation layer.

In the above description, the second high thermal conduction member 36 is a member different from the first high thermal conduction member 28, but the first high thermal conduction member 28 and the second high thermal conduction member 36 may be formed as one component. For example, the first high thermal conduction member 28 may have a thicker portion than the other portion so that the thicker portion faces the separation area B and functions as the second high thermal conduction member 36.

The above-described fixing devices may include the separation plate 41 and pressure roller 21 that are grounded via the same resistor 39. Similar to the above-described embodiments of the present disclosure, the same resistor 39 secures the certain insulation resistance between the separation plate 41 and the side plate 40 and the certain insulation resistance between pressure roller 21 and the side plate 40. As a result, the above-described configuration can reduce the number of components and the size and cost of the fixing device. Each of the fixing devices 9 illustrated in FIGS. 20, 25, and 32 has the configuration of the first embodiment illustrated in FIG. 2. Additionally, each of the above-described fixing devices 9 may have the configurations according to the other embodiments illustrated in FIGS. 6 to 13.

Figure 33:
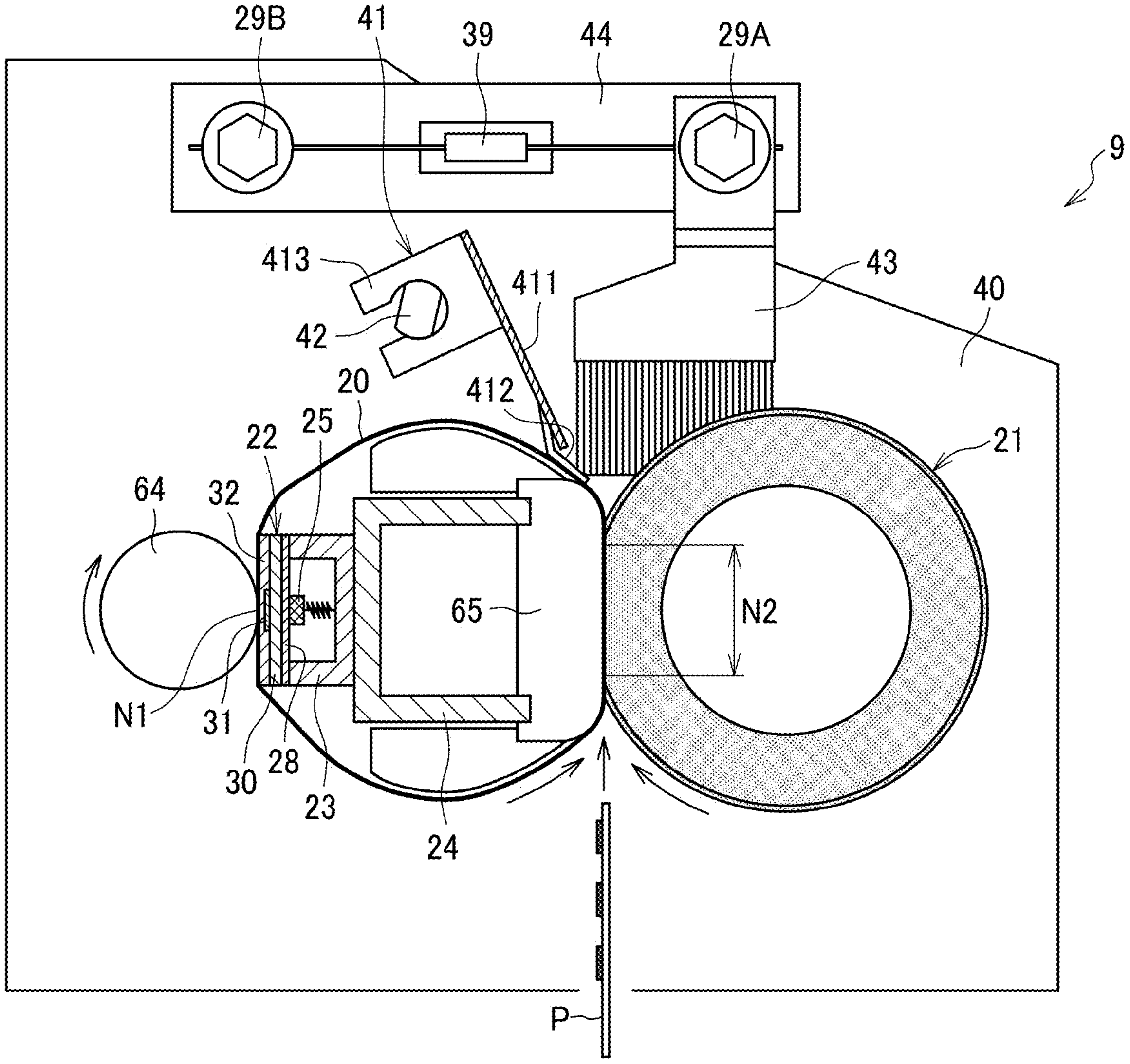
FIG. 33 is a vertical cross-sectional view of the fixing device viewed from the lateral side of the fixing device different from the above-described embodiments.
Figure 34:
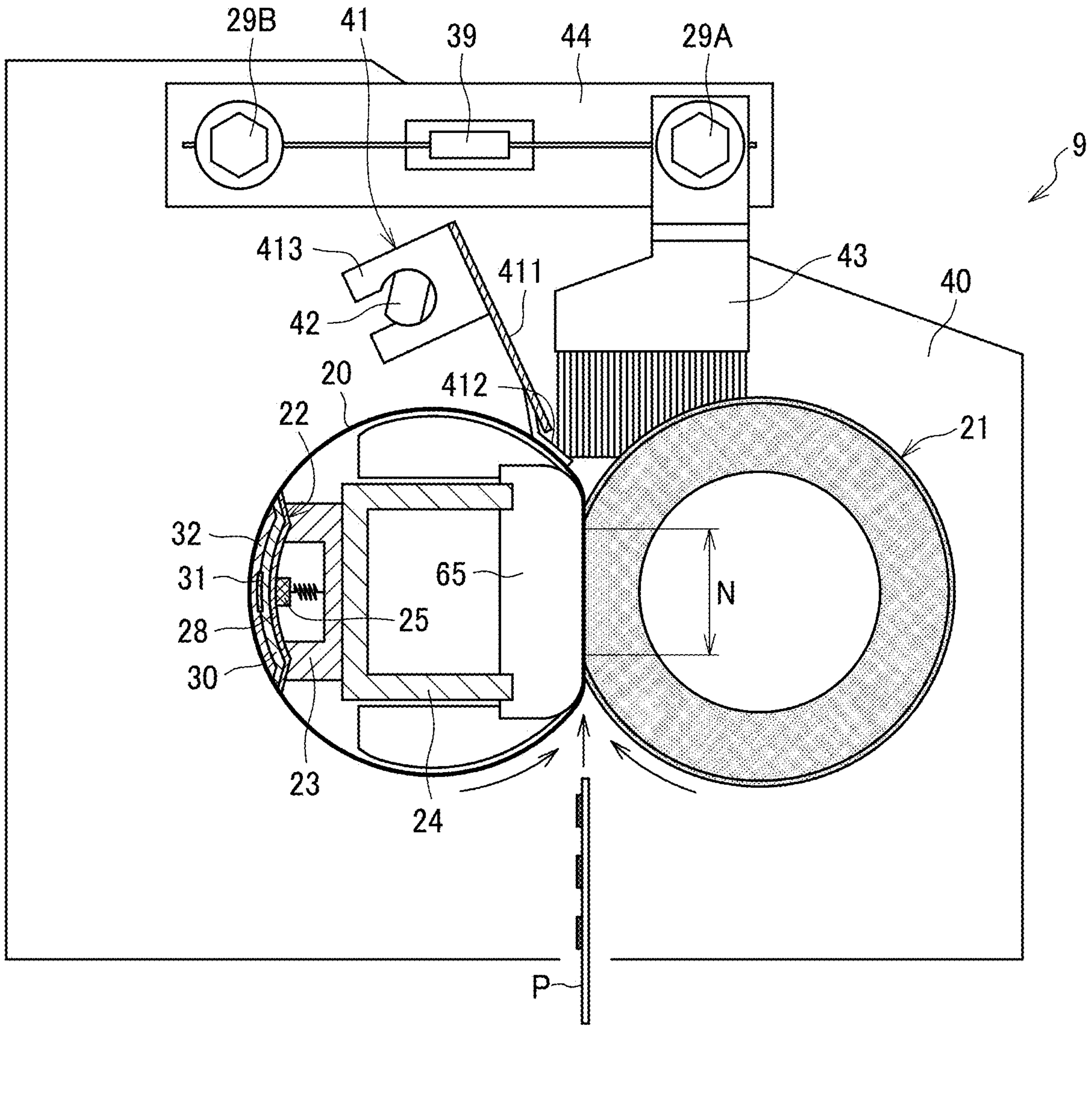
FIG. 34 is a vertical cross-sectional view of the fixing device viewed from the lateral side of the fixing device different from the above-described embodiments.
Figure 35:
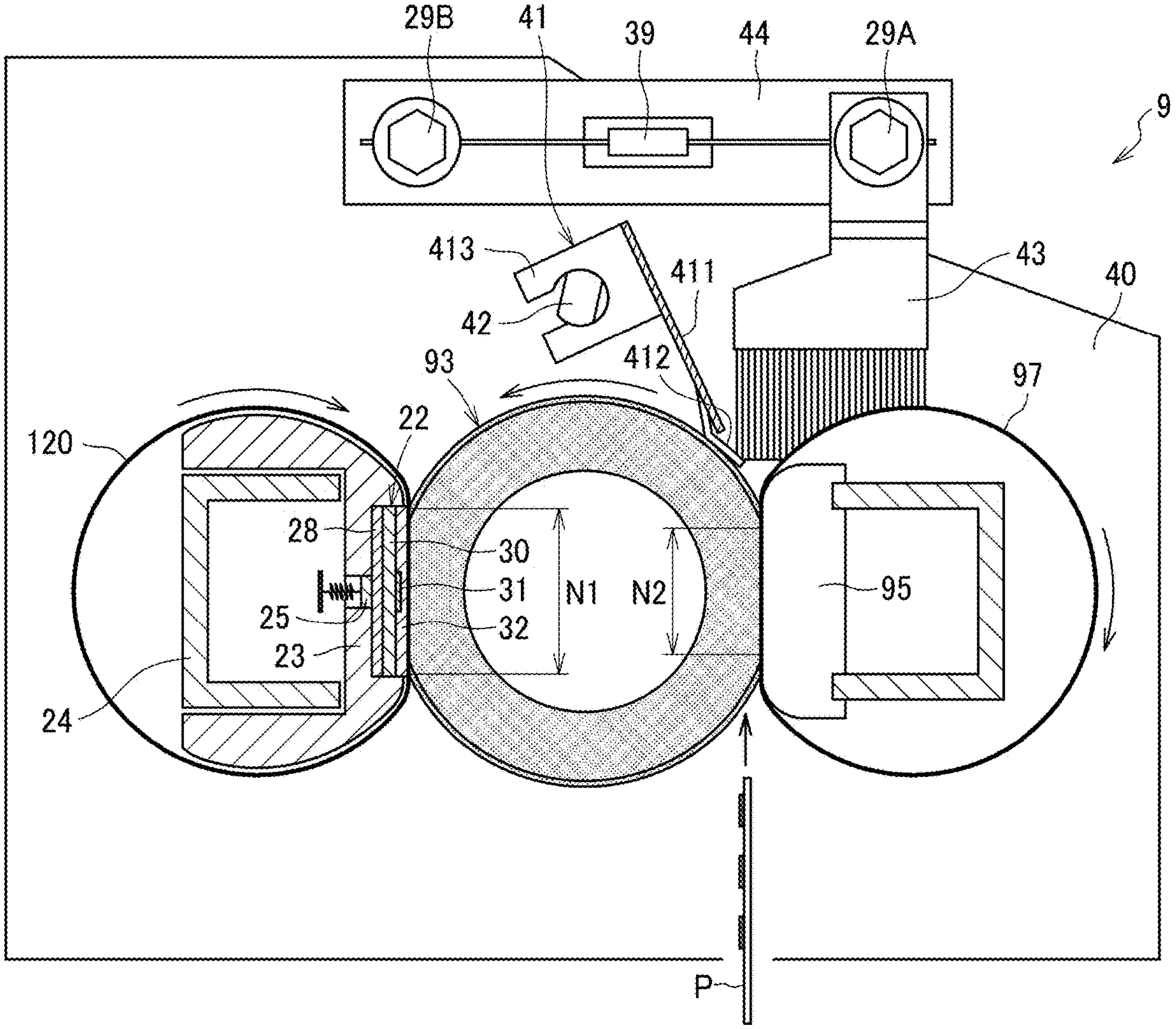
FIG. 35 is a vertical cross-sectional view of the fixing device viewed from the lateral side of the fixing device different from the above-described embodiments.

In addition, the embodiments of the present disclosure are applicable to fixing devices illustrated in FIGS. 33 to 35. The configurations of fixing devices illustrated in FIGS. 33 to 35 are described below.

The fixing device 9 illustrated in FIG. 33 has a heating nip N1 in which the heater 22 heats the fixing belt 20 and a fixing nip N2 through which the sheet P passes, and the heating nip N1 and the fixing nip N2 are formed at different positions. Specifically, the fixing device 9 in this example includes a nip formation pad 65 inside the loop of the fixing belt 20 in addition to the heater 22. A pressure roller 64 presses the heater 22 via the fixing belt 20 to form the heating nip N1, and a pressure roller 21 presses the nip formation pad 65 to form the fixing nip N2. In the above-described fixing device 9, the heater 22 heats the fixing belt 20 in the heating nip N1, and the fixing belt 20 applies the heat to the sheet P in the fixing nip N2 to fix the unfixed image onto the sheet P.

Next, the fixing device 9 illustrated in FIG. 34 is described. The fixing device 9 illustrated in FIG. 34 omits the above-described pressure roller 64 adjacent to the heater 22 from the fixing device 9 illustrated in FIG. 33 and includes the heater 22 formed to be arc having a curvature of the fixing belt 20. The other configuration is the same as the configuration illustrated in FIG. 33. In this case, the arc shaped heater 22 surely maintains a length of the contact between the fixing belt 20 and the heater 22 in the belt rotation direction to efficiently heat the fixing belt 20.

Subsequently, the fixing device 9 illustrated in FIG. 35 includes belts 97 and 120 disposed on both sides of a roller

93. In this example, the fixing device 9 includes the heater 22 disposed inside the loop of the belt 120 on the left side in FIG. 35 and a nip formation pad 95 disposed inside the loop of the belt 97 on the right side in FIG. 35. The heater 22 is in contact with the roller 93 via the left belt 120 having conductivity (that is, a conductive member), and the nip formation pad 95 is in contact with the roller 93 (that is, the first rotator) via the right belt 97 (that is, the second rotator), thereby forming the heating nip N1 and the fixing nip N2.

The above-described fixing devices 9 illustrated in FIGS. 33 to 35 may have the configurations of the above-described embodiments according to the present disclosure to obtain the same functions and effects as the above-described embodiments. That is, each of the fixing devices 9 can have the grounding structure that secures the certain insulation resistance between the separation plate 41 and the side plate 40 and the certain insulation resistance between the pressure roller 21 and the side plate 40. As a result, the size and cost of the fixing device is reduced. Each of the fixing devices 9 illustrated in FIGS. 32 to 35 has the configuration of the first embodiment illustrated in FIG. 2. Additionally, each of the above-described fixing devices 9 may have the configurations according to the other embodiments illustrated in FIGS. 6 to 13.

Figure 36:
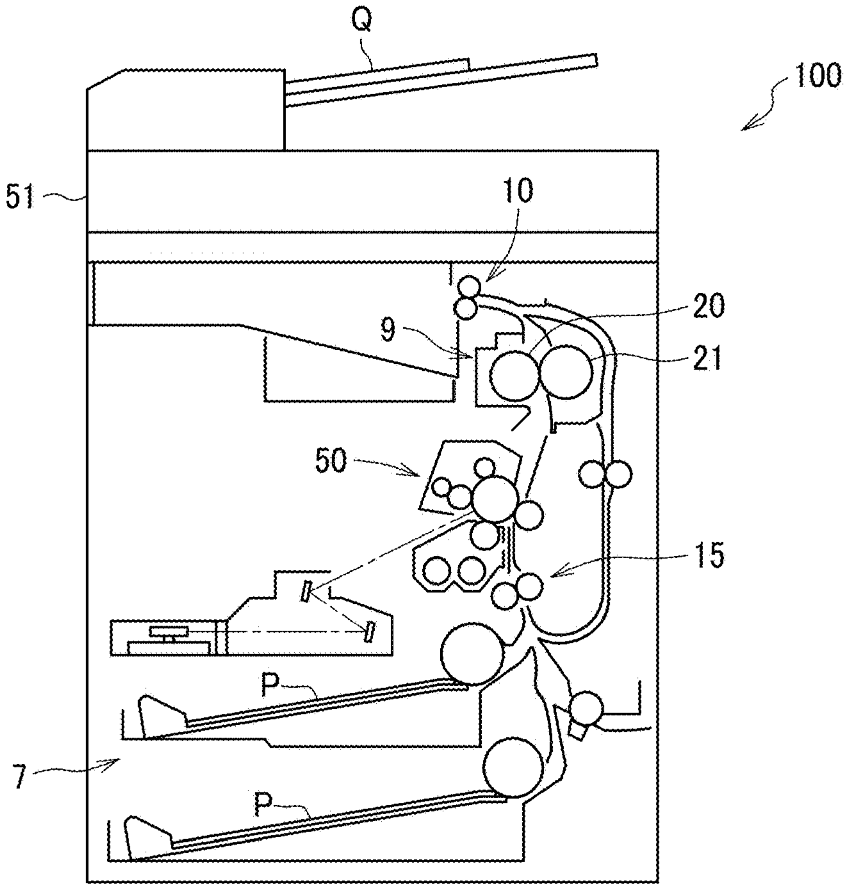
FIG. 36 is a schematic cross-sectional view of an image forming apparatus having a configuration different from the image forming apparatus of FIG. 1.

The image forming apparatus to which the embodiments of the present disclosure may be applied is not limited to the color image forming apparatus illustrated in FIG. 1, and the embodiments of the present disclosure may be applied to an image forming apparatus having a configuration illustrated in FIG. 36. The following describes another embodiment of the image forming apparatus to which the present embodiments may be applied.

The image forming apparatus 100 illustrated in FIG. 36 includes an image forming device 50 including a photoconductor drum and the like, a sheet conveyer including the timing roller pair 15 and the like, the sheet feeder 7, the fixing device 9, the sheet ejection device 10, and a reading device 51. The sheet feeder 7 includes the plurality of sheet feeding trays, and the sheet feeding trays stores sheets of different sizes, respectively.

The reading device 51 reads an image of a document Q. The reading device 51 generates image data from the read image. The sheet feeder 7 stores the plurality of sheets P and feeds the sheet P to the conveyance path. The timing roller pair 15 conveys the sheet P on the conveyance path to the image forming device 50.

The image forming device 50 forms a toner image on the sheet P. Specifically, the image forming device 50 includes the photoconductor drum, a charging roller, the exposure device, the developing device, a supply device, a transfer roller, the cleaning device, and a discharging device. The toner image is, for example, an image of the document Q. The fixing device 9 heats and presses the toner image to fix the toner image on the sheet P.

Conveyance rollers convey the sheet P on which the toner image has been fixed to the sheet ejection device 10. The sheet ejection device 10 ejects the sheet P to the outside of the image forming apparatus 100.

Next, the fixing device 9 to which the embodiments of the present disclosure can be applied is described with reference to FIG. 37. In the configuration illustrated in FIG. 37, components common to those of the fixing device 9 of the above-described embodiment illustrated in FIG. 2 are denoted by the same reference numerals, and a description thereof will be omitted.

Figure 37:
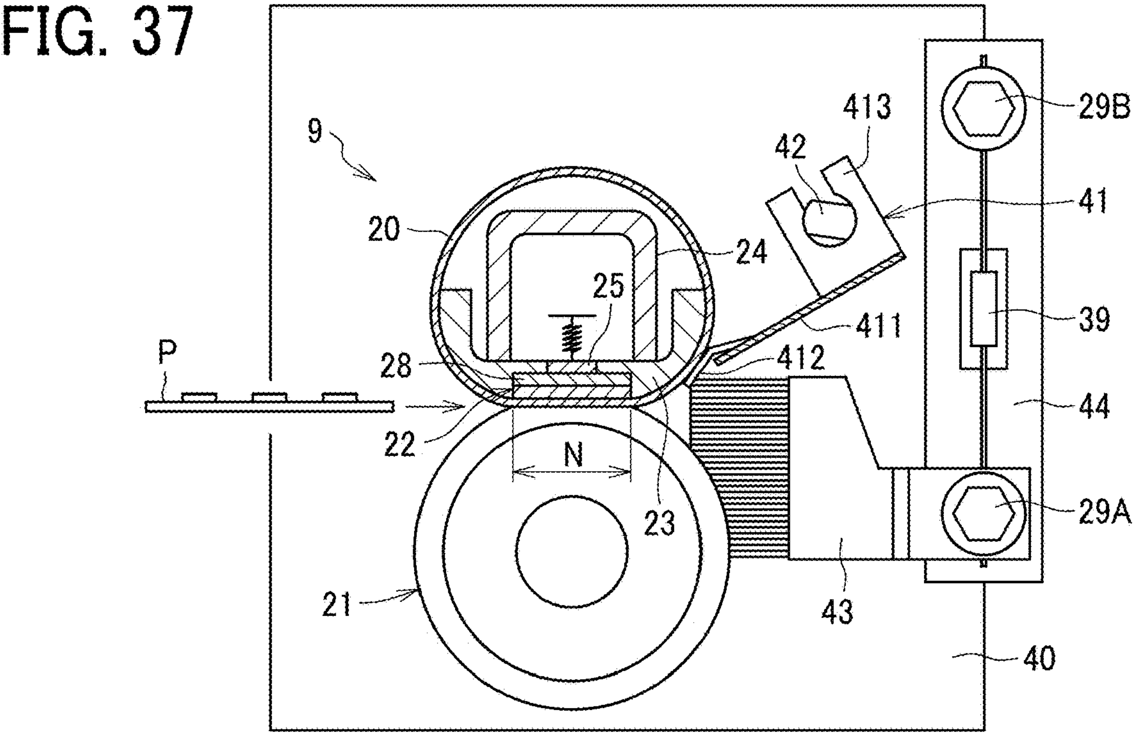
FIG. 37 is a vertical cross-sectional view of the fixing device viewed from the lateral side of the fixing device illustrated in FIG. 36.

As illustrated in FIG. 37, the fixing device 9 includes the fixing belt 20, the pressure roller 21, the heater 22, the heater holder 23, the stay 24, the thermistors 25, the first high thermal conduction member 28, the separation plate 41, the discharging brush 43, the resistor 39, the resistor holder 44, and the side plate 40.

The fixing nip N is formed between the fixing belt 20 and the pressure roller 21. The nip width of the fixing nip N is 10 mm, and the linear velocity of the fixing device 9 is 240 mm/s.

The fixing belt 20 includes a polyimide base and the release layer and does not include the elastic layer. The release layer is made of a heat-resistant film material made of, for example, fluororesin. The outer loop diameter of the fixing belt 20 is about 24 mm.

The pressure roller 21 includes the core 21*a*, the elastic layer 21*b*, and the surface layer. The pressure roller 21 has an outer diameter of 24 to 30 mm, and the elastic layer 21*b* has a thickness of 3 to 4 mm.

The heater 22 includes the base, the thermal insulation layer, the conductor layer including the resistive heat generator and the like, and the insulation layer, and is formed to have a thickness of 1 mm as a whole. A width of the heater 22 in the direction intersecting the arrangement direction is 13 mm.

Figure 38:
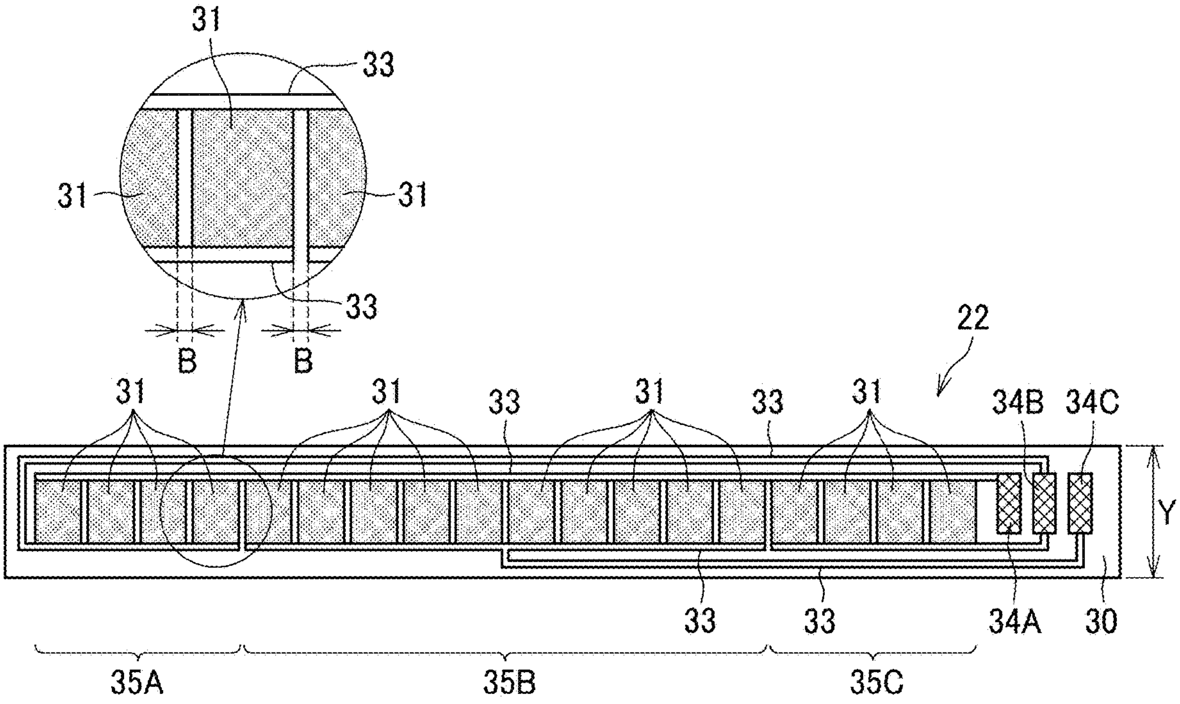
FIG. 38 is a plan view of a heater illustrated in FIG. 37.

As illustrated in FIG. 38, the conductor layer of the heater 22 includes a plurality of resistive heat generators 31, power supply lines 33, and electrodes 34A to 34C. As illustrated in the enlarged view of FIG. 38, the fixing device in this example also has the separation area B formed between neighboring resistive heat generators of the plurality of resistive heat generators 31 arranged in the arrangement direction. The enlarged view of FIG. 38 illustrates two separation areas B, but the separation area B is formed between neighboring resistive heat generators of all the plurality of resistive heat generators 31.

The heater 22 includes a central heat generation portion 35B and end heat generation portions 35A and 35C at both sides of the central heat generation portion 35B. The central heat generation portion 35B and the end heat generation portions 35A and 35C are configured by the plurality of resistive heat generators 31. The end heat generation portions 35A and 35C can generate heat separately from the central heat generation portion 35B. For example, choosing a left electrode 58A and a central electrode 58B of the three electrodes 58A to 58C and applying a voltage between the left electrode 58A and the central electrode 58B in FIG. 38 causes the end heat generation portions 35A and 35C adjacent to both sides of the central heat generation portion 35B to generate heat. Applying the voltage between the left electrode 34A and a right electrode 34C causes the central heat generation portion 35B to generate heat. To fix the image onto a small sheet, the central heat generation portion 35B alone can generate heat. To fix the image onto a large sheet, all the heat generation portions 35A to 35C can generate heat. As a result, the heater in the fixing device can generate heat in accordance with the size of the sheet.

Figure 39:
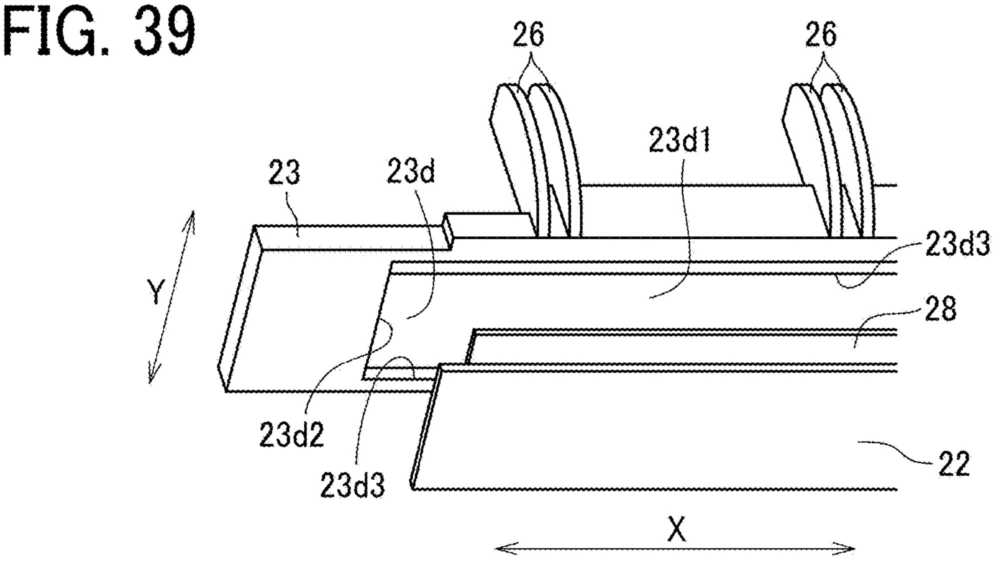
FIG. 39 is a partial perspective view of a heater holder and the heater illustrated in FIG. 37.

As illustrated in FIG. 39, the heater holder 23 holds the heater 22 and the first high thermal conduction member 28 in a recessed portion 23*d*. The recessed portion 23*d* is formed on the side of the heater holder 23 facing the heater 22. The recessed portion 23*d* has a bottom surface 23*d*1 and walls 23*d*2 and 23*d*3. The bottom surface 23*d*1 is substantially parallel to the base 30 and the surface recessed from the side of the heater holder 23 toward the stay 24. The walls 23*d*2 are both side surfaces of the recessed portion 23*d* in the arrangement direction and extend in the direction Y intersecting the arrangement direction. The recessed portion 23*d* may have one wall 23*d*2 and not have the other wall 23*d*2.

The walls 23$d$3 are both side surfaces of the recessed portion 23$d$ in the direction Y intersecting the arrangement direction and extend in the arrangement direction (that is, the direction indicated by the arrow X). The heater holder 23 is made of LCP.

Figure 40:
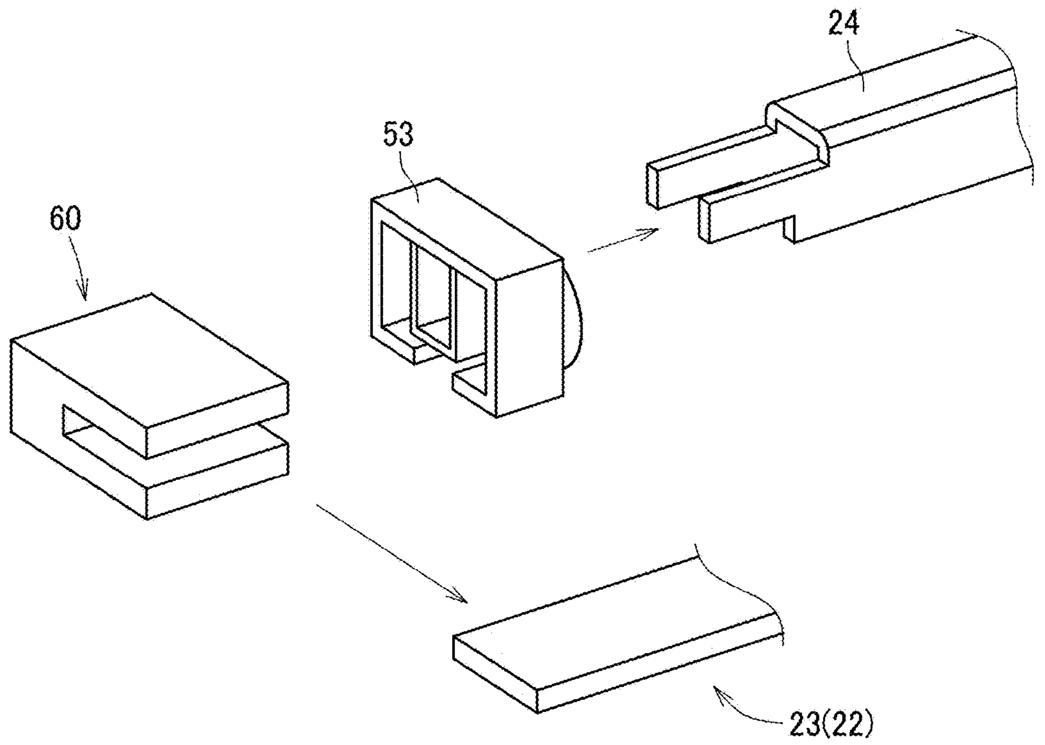
FIG. 40 is a view to illustrate a method of attaching a connector to the heater illustrated in FIG. 37.

As illustrated in FIG. 40, a connector 60 holds the heater 22 and the heater holder 23. The connector 60 includes a housing made of resin such as LCP and a plurality of contact terminals fixed to the inner surface of the housing.

The connector 60 is attached to the heater 22 and the heater holder 23 such that a front side of the heater 22 and the heater holder 23 and a back side of the heater 22 and the heater holder 23 are sandwiched by the connector 60. In this state, the contact terminals contact and press against the electrodes of the heater 22, respectively, and the resistive heat generators 31 are electrically coupled to the power supply disposed in the image forming apparatus via the connector 60. As a result, the power supply can supply electric power to the resistive heat generators 31.

A flange 53 illustrated in FIG. 40 contacts the inner circumferential surface of the fixing belt 20 at each of both ends of the fixing belt 20 in the arrangement direction to hold the fixing belt 20. The flange 53 is inserted into each of both ends of the stay 24 (see an arrow direction from the flange 53 in FIG. 37) and fixed on the housing of the fixing device 9. The flange 53 is made of LCP.

To attach to the heater 22 and the heater holder 23, the connector 60 is moved in the direction Y intersecting the arrangement direction (see a direction indicated by the arrow from the connector 60 in FIG. 40). The connector 60 and the heater holder 23 may have a convex portion and a recessed portion to attach the connector 60 to the heater holder 23. The convex portion disposed on one of the connector 60 and the heater holder 23 is engaged with the recessed portion disposed on the other and relatively move in the recessed portion to attach the connector 60 to the heater holder 23.

The connector 60 is attached to one end of the heater 22 and one end of the heater holder 23 in the arrangement direction. The one end of the heater 22 and the one end of the heater holder 23 are farther from a portion in which the pressure roller 21 receives a driving force from a drive motor than the other end of the heater 22 and the other end of the heater holder 23, respectively.

Figure 41:
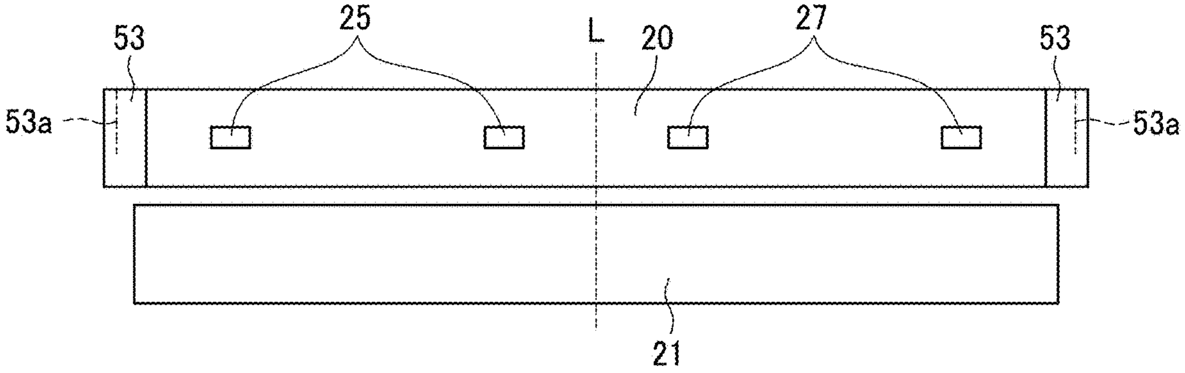
FIG. 41 is a diagram illustrating an arrangement of temperature sensors and thermostats included in the fixing device illustrated in FIG. 36.

As illustrated in FIG. 41, one thermistor 25 faces a center portion of the inner circumferential surface of the fixing belt 20 in the arrangement direction, and another thermistor 25 faces an end portion of the inner circumferential surface of the fixing belt 20 in the arrangement direction. The heater 22 is controlled based on the temperature of the center portion of the fixing belt 20 and the temperature of the end portion of the fixing belt 20 in the arrangement direction that are detected by the thermistors 25.

As illustrated in FIG. 41, one thermostat 27 faces a center portion of the inner circumferential surface of the fixing belt 20 in the arrangement direction, and another thermostat 27 faces an end portion of the inner circumferential surface of the fixing belt 20 in the arrangement direction. Each of the thermostats 27 shuts off a current to the heater 22 in response to a detection of a temperature of the fixing belt 20 higher than a predetermined threshold value.

Figure 42:
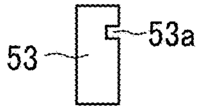
FIG. 42 is a schematic diagram illustrating a groove of a flange illustrated in FIG. 40.

As illustrated in FIG. 42, the flange 53 has a slide groove 53$a$. The slide groove 53$a$ extends in a direction in which the fixing belt 20 moves toward and away from the pressure roller 21. An engaging portion of the housing of the fixing device 9 is engaged with the slide groove 53$a$. The relative movement of the engaging portion in the slide groove 53$a$ enables the fixing belt 20 to move toward and away from the pressure roller 21.

The fixing devices 9 configured as described above (see FIG. 37) may have the configurations of the above-described embodiments according to the present disclosure to obtain the same functions and effects as the above-described embodiments. The fixing devices 9 illustrated in FIG. 37 has the configuration of the first embodiment illustrated in FIG. 2. Additionally, the above-described fixing devices 9 may have the configurations according to the other embodiments illustrated in FIGS. 6 to 13.

Figure 43:
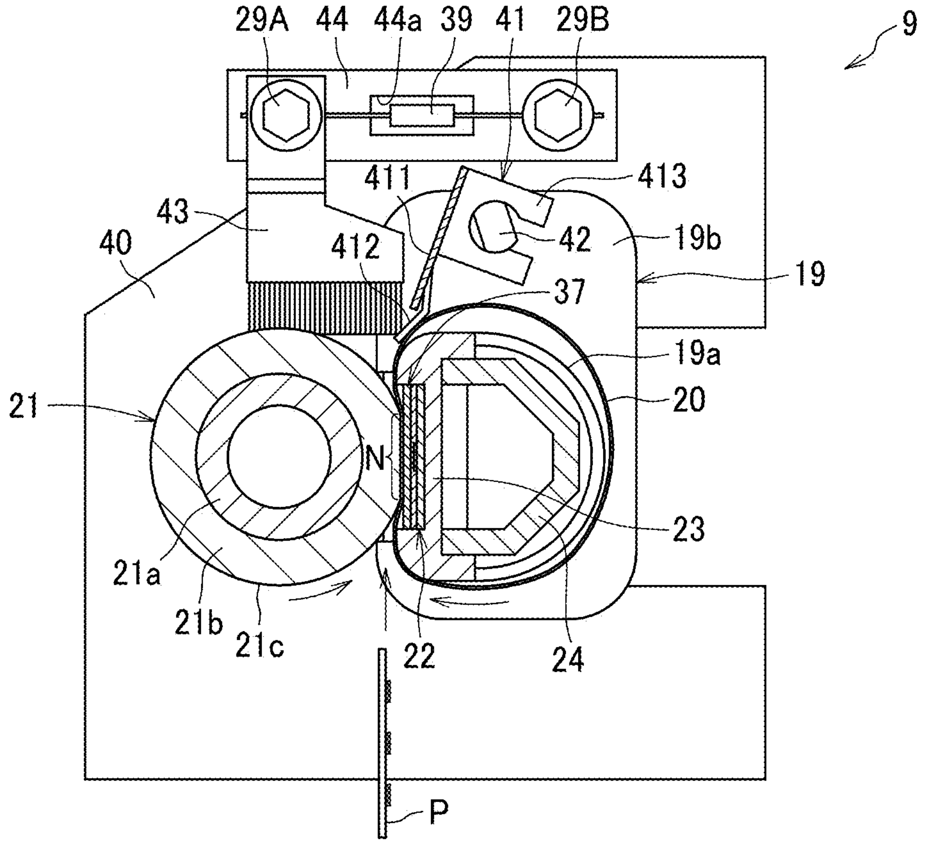
FIG. 43 is a vertical cross-sectional view of the fixing device viewed from the lateral side of the fixing device different from the above-described embodiments.

In addition, the embodiments of the present disclosure are applicable to the fixing device 9 illustrated in FIG. 43 that includes a thermal equalization plate 37 as a thermal conduction aid between the heater 22 and the inner circumferential surface of the fixing belt 20. The thermal equalization plate 37 is made of a material having a higher thermal conductivity than the thermal conductivity of the heater holder 23, such as copper, aluminum, or silver. The thermal equalization plate 37 moves heat from the heater 22 in the longitudinal direction of the fixing belt 20 to uniformly heat the fixing belt 20. Since the thermal equalization plate 37 is made of a conductive material, a current may flow from the heater 22 to the pressure roller 21 and the separation plate 41 through the thermal equalization plate 37. Accordingly, the embodiments of present disclosure may be applied to the above-described fixing device 9. The same resistor 39 secures the certain insulation resistance between the separation plate 41 and the side plate 40 and the certain insulation resistance between pressure roller 21 and the side plate 40. As a result, the above-described configuration can reduce the number of components and the size and cost of the fixing device.

Figure 44:
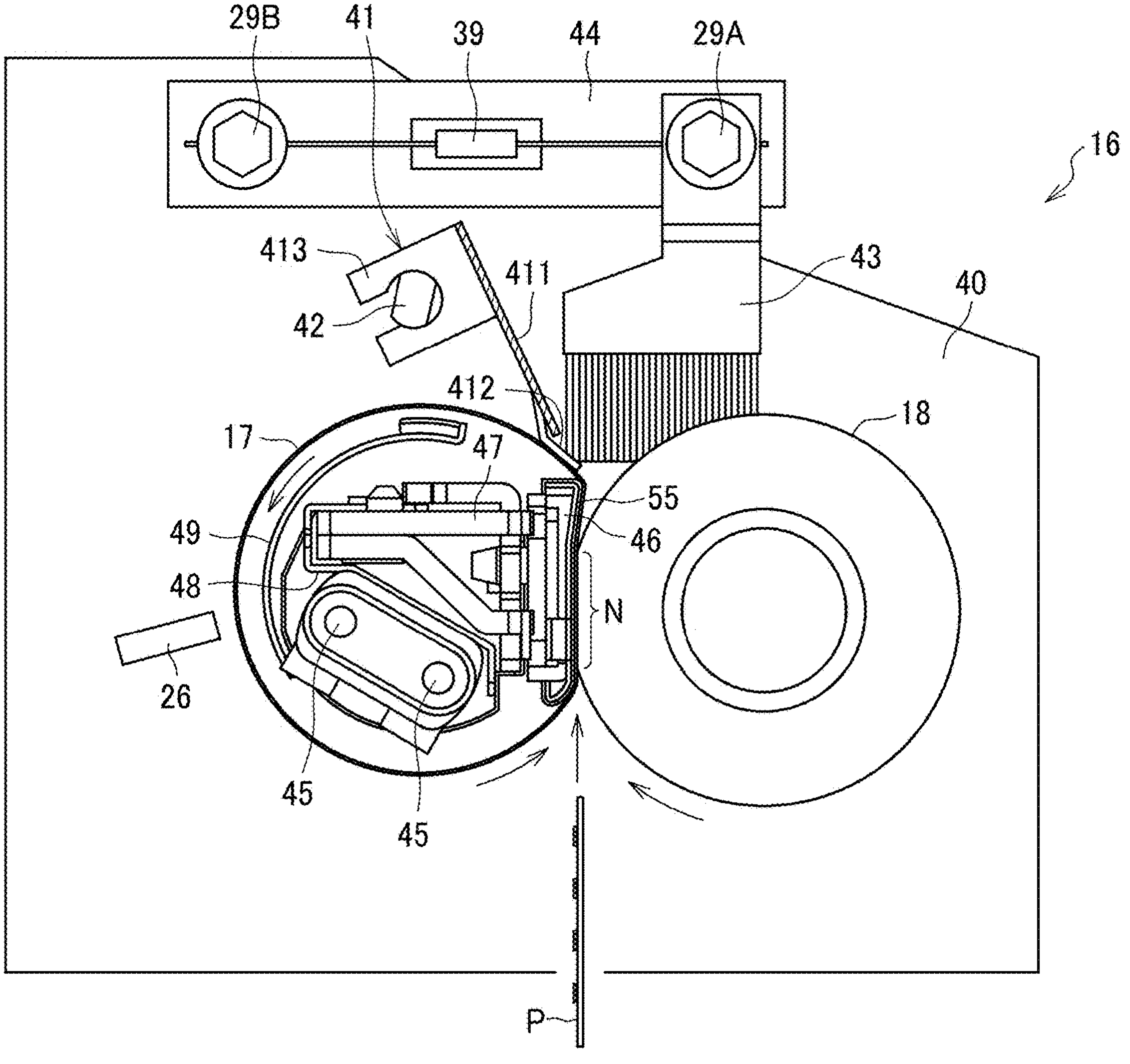
FIG. 44 is a vertical cross-sectional view of the fixing device viewed from the lateral side of the fixing device different from the above-described embodiments.

In addition, the embodiments of the present disclosure are applicable to a fixing device 16 illustrated in FIG. 44 that includes a halogen heater 45 as a heater.

The fixing device 16 illustrated in FIG. 44 includes a fixing belt 17, a pressure roller 18, halogen heaters 45, a nip formation pad 46, a stay 47, a reflector 48, a shield 49, temperature sensors 26, and a thermal equalization plate 55.

The halogen heater 45 is the heater heating the fixing belt 17 and disposed inside the loop of the fixing belt 17 not to be in contact with the fixing belt 17. In FIG. 44, the two halogen heaters 45 are disposed inside the loop of the fixing belt 17. However, the number of the halogen heaters 45 is not limited to two. Alternatively, a single halogen heater 45 may be disposed. Three or more halogen heaters 45 may be disposed.

Figure 45:
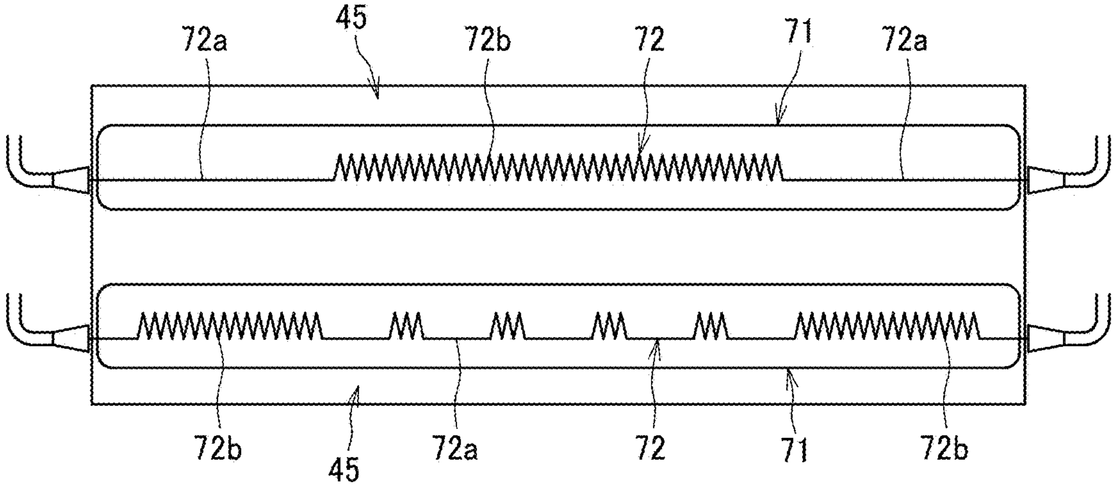
FIG. 45 is a diagram illustrating a configuration of halogen heaters.

As illustrated in FIG. 45, the halogen heater 45 includes a glass tube 71 made of quartz glass or the like and a filament 72 accommodated in the glass tube 71. The filament 72 has a linear part 72$a$ having a linear shape and a densely wound part 72$b$ densely wound in a coil shape. The densely wound part 72$b$ is the resistive heat generator (in other words, a heating portion or a light emitting portion) that generates heat when power is supplied to the halogen heater 45.

The nip formation pad 46 illustrated in FIG. 44 is disposed opposite the pressure roller 18 to sandwich the fixing belt 17 between the fixing belt 17 and the pressure roller 18. The nip formation pad 46 and the pressure roller 18 form the nip N. Pressing the pressure roller 18 against the nip formation pad 46 via the fixing belt 17 forms the nip N in a portion in which the fixing belt 17 and the pressure roller 18 are in contact with each other. The configurations of the pressure roller 18 and the fixing belt 17 are basically the same as those of the pressure roller 21 and the fixing belt 20 in the embodiment illustrated in FIG. 2.

The stay 47 is a support supporting the nip formation pad 46. The stay 47 supporting the nip formation pad 46 prevents the nip formation pad 46 from being bent by the pressure of the pressure roller 18 and forms the nip N having a uniform width.

The reflector 48 reflects radiant heat emitted from the halogen heaters 45 toward the inner circumferential surface of the fixing belt 17. The reflector 48 is fixed and supported by the stay 47 so as to face the halogen heaters 45. The reflector 48 reflects, to the fixing belt 17, the radiant heat emitted from the halogen heaters 45 to efficiently heat the fixing belt 17. Since the reflector 48 is interposed between the halogen heater 45 and the stay 47, the reflector 48 prevents the radiant heat emitted from the halogen heaters 45 from transmitting to the stay 47, which saves energy consumption.

The shield 49 is movably disposed inside the loop of the fixing belt 17 and shields the radiant heat emitted from the halogen heaters 45 to the fixing belt 17. The shield 49 moved to be disposed between halogen heaters 45 and the fixing belt 17 shields the radiant heat emitted from each halogen heater 45 to the fixing belt 17 and prevents the fixing belt 17 from being excessively heated. When the shield 49 retracts from a position between halogen heaters 45 and the fixing belt 17 to a position illustrated in FIG. 44, the halogen heaters 45 effectively heat the fixing belt 17.

Like the thermal equalization plate 37 illustrated in FIG. 43, the thermal equalization plate 55 is the thermal conduction aid made of a member having a high thermal conductivity. The thermal equalization plate 55 is interposed between the nip formation pad 46 and the fixing belt 17 and moves heat of the fixing belt 17 in the longitudinal direction to uniformly heat the fixing belt 17.

The temperature sensors 26 are disposed so as to face the outer surface of the fixing belt 17 and not to be in contact with the fixing belt 17 and detect temperatures of the fixing belt 17.

As illustrated in FIG. 44, the above-described fixing device 16 may include the discharging brush 43 that is brought into contact with both the separation plate 41 and the pressure roller 18 and the resistor 39 that electrically couples the discharging brush 43 to the side plate 40, which is the same as the above-described embodiments. The resistor 39 secures the certain insulation resistance between the separation plate 41 and the side plate 40 and the certain insulation resistance between pressure roller 18 and the side plate 40 and couples the separation plate 41 and the pressure roller 18 to the ground. Setting the electric resistance value of the resistor 39 so that the current appropriately flows from the separation plate 41 and the pressure roller 18 to the side plate 40 via the resistor 39 as described above prevents the charge from being stored in the separation plate 41 and the pressure roller 18 and limits the current flowing from the separation plate 41 and the pressure roller 18 to the side plate 40. Coupling the separation plate 41 and the pressure roller 18 to the ground via the same resistor 39 can reduce the number of components and the size and cost of the fixing device 16. The fixing devices 16 illustrated in FIG. 44 has the configuration of the first embodiment illustrated in FIG. 2. Additionally, the above-described fixing devices 16 may have the configurations according to the other embodiments illustrated in FIGS. 6 to 13.

Figure 46:
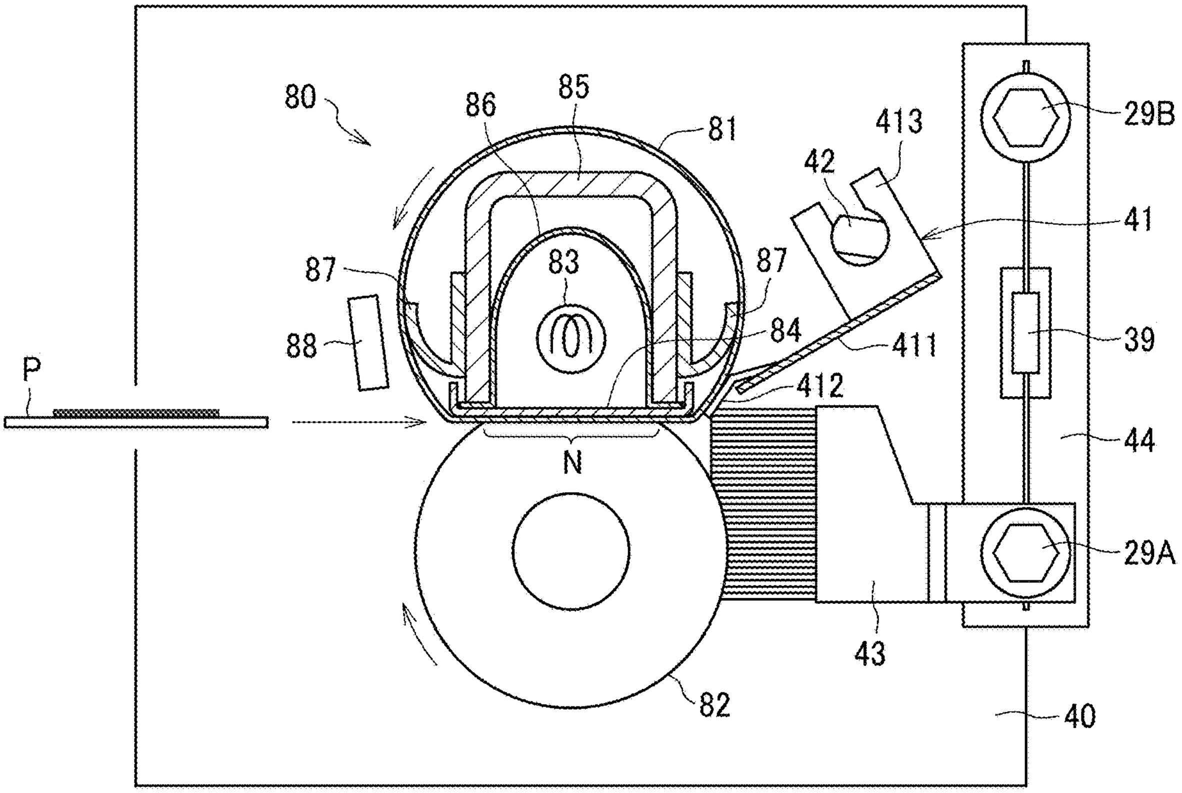
FIG. 46 is a vertical cross-sectional view of the fixing device viewed from the lateral side of the fixing device different from the above-described embodiments.

In addition, the embodiments of the present disclosure are applicable to a fixing device 80 illustrated in FIG. 46.

The fixing device 80 illustrated in FIG. 46 includes a fixing belt 81, a pressure roller 82, a halogen heater 83, a nip formation pad 84, a stay 85, a reflector 86, guides 87, temperature sensors 88.

The fixing belt 81, the pressure roller 82, the halogen heater 83, the nip formation pad 84, the stay 85, the reflector 86, and the temperature sensor 88 have basically the same functions as the fixing belt 17, the pressure roller 18, the halogen heater 45, the nip formation pad 46, the reflector 48, and the temperature sensor 26 illustrated in FIG. 44.

However, the reflector 86 illustrated in FIG. 46 reflects the radiant heat emitted from the halogen heater 83 mainly to the nip formation pad 84, not to the fixing belt 81. The reflector 86 has a U-shaped cross-section to cover the outside of the halogen heater 83. The reflector 86 has an inner face facing the halogen heater 83 and serving as a reflecting surface having a relatively high reflectance. When the radiant heat is emitted from the halogen heater 83, the reflecting surface of the reflector 86 reflects the radiant heat to the nip formation pad 84. As a result, the nip formation pad 84 is heated by the radiant heat emitted from the halogen heater 83 toward the nip formation pad 84 and the radiant heat reflected by the reflector 86 to the nip formation pad 84. The heat is conducted from the nip formation pad 84 to the fixing belt 81 at the fixing nip N. In this case, the nip formation pad 84 that forms the nip N functions as a heat conductor that conducts heat to the fixing belt 81 at the fixing nip N. To conduct heat, the nip formation pad 84 is made of metal having good thermal conductivity such as copper or aluminum.

The guides 87 are disposed inside the loop of the fixing belt 81 to guide the inner circumferential surface of the fixing belt 81 rotating. Since the fixing belt 81 is guided by the guides 87, the fixing belt 81 smoothly rotates without being largely deformed.

Applying the embodiments of present disclosure to the above-described fixing device 80 can provide the grounding structure that secures the certain insulation resistance and reduce the number of components and the size and cost of the fixing device. As illustrated in FIG. 46, the above-described fixing device 80 may include the discharging brush 43 that is brought into contact with both the separation plate 41 and the pressure roller 82 and the resistor 39 that electrically couples the discharging brush 43 to the side plate 40. The resistor 39 secures the certain insulation resistance between the separation plate 41 and the side plate 40 and the certain insulation resistance between pressure roller 82 and the side plate 40 and couples the separation plate 41 and the pressure roller 82 to the ground. Setting the electric resistance value of the resistor 39 so that the current appropriately flows from the separation plate 41 and the pressure roller 82 to the side plate 40 via the resistor 39 as described above prevents the charge from being stored in the separation plate 41 and the pressure roller 82 and limits the current flowing from the separation plate 41 and the pressure roller 82 to the side plate 40. Coupling the separation plate 41 and the pressure roller 82 to the ground via the same resistor 39 can reduce the number of components and the size and cost of the fixing device 80. The fixing devices 80 illustrated in FIG. 46 has the configuration of the first embodiment illustrated in FIG. 2. Additionally, the above-described fixing devices 80 may have the configurations according to the other embodiments illustrated in FIGS. 6 to 13.

The above-described embodiments of the present disclosure have at least the following aspects.

First Aspect

In a first aspect, a fixing device includes a first rotator, a second rotator, a heater, a separator, and a resistor. The second rotator is in contact with an outer circumferential surface of the first rotator to form a nip through which a recording medium bearing an unfixed image passes. The heater includes a heat generator and heats the first rotator. The separator is in contact with an outer circumferential surface of the first rotator and separates the recording medium passing through the nip from the first rotator. The resistor couples the second rotator and the separator to the ground.

Second Aspect

In a second aspect, the fixing device according to the first aspect further includes a discharger electrically coupling to the resistor and being in direct contact with both the separator and the second rotator.

Third Aspect

In a third aspect, the fixing device according to the first aspect further includes a discharger and a conductor. The discharger is electrically coupled to the resistor and in direct contact with any one of the separator and the second rotator. The conductor is in direct contact with the separator and the second rotator.

Fourth Aspect

In a fourth aspect, the fixing device according to the first aspect further includes a discharger and a conductor. The discharger is electrically coupled to the resistor. The conductor is in direct contact with the separator, the second rotator, and the discharger.

Fifth Aspect

In a fifth aspect, the fixing device according to the first aspect further includes a discharger and a conductor. The discharger is electrically coupled to the resistor and in direct contact with the second rotator. The conductor is in direct contact with the discharger and the separator.

Sixth Aspect

In a sixth aspect, the fixing device according to any one of the first to fifth aspects further includes a housing grounded, and the second rotator and the separator are electrically coupled to the housing via the resistor. In addition, a creepage distance between the second rotator and the housing and a creepage distance between the separator and the housing are 2.5 mm or more.

Seventh Aspect

In a seventh aspect, the fixing device according to any one of the first to sixth aspects further includes a belt holder made of resin. The belt holder rotatably holds the first rotator and is attached to the separator, and the first rotator is an endless belt.

Eighth Aspect

In an eighth aspect, the discharger in the fixing device according to any one of the second to seventh aspects is disposed between the second rotator and the separator.

Ninth Aspect

In a ninth aspect, the discharger in the fixing device according to any one of the second to eighth aspects is disposed downstream from the nip in a recording medium conveyance direction.

Tenth Aspect

In a tenth aspect, the heater in the fixing device according to any one of the first to ninth aspects includes an insulation layer covering the heat generator and being in contact with an inner circumferential surface of the first rotator.

Eleventh Aspect

In an eleventh aspect, a volume resistance of the conductor in the fixing device according to any one of the third to tenth aspects is 110 kΩ or more.

Twelfth Aspect

In a twelfth aspect, the conductor in the fixing device according to any one of the third to eleventh aspects is made of conductive resin.

Thirteenth Aspect.

In a thirteenth aspect, the separator in the fixing device according to any one of the first to twelfth aspects is in contact with the first rotator at a position facing a region outside a maximum recording medium passing region through which a recording medium having a maximum width passes.

Fourteenth Aspect

In a fourteenth aspect, the heater in the fixing device according to any one of the first to thirteenth aspects is in direct contact with the first rotator or in contact with a conductive member that is in contact with the first rotator.

Fifteenth Aspect

In a fifteenth aspect, an image forming apparatus includes the fixing device according to any one of the first to fourteenth aspects.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A fixing device, comprising:

a first rotator;

a second rotator in contact with an outer circumferential surface of the first rotator to form a nip through which a recording medium bearing an unfixed image passes;

a heater including a heat generator and configured to heat the first rotator;

a separator in contact with the outer circumferential surface of the first rotator and configured to separate the recording medium passing through the nip from the first rotator;

a resistor coupling the second rotator and the separator to ground; and a discharger electrically coupled to the resistor and in direct contact with both the separator and the second rotator.

2. The fixing device according to claim 1, further comprising:

a conductor in direct contact with the separator, the second rotator, and the discharger.

3. The fixing device according to claim 1, further comprising:

a conductor in direct contact with the discharger and the separator.

4. The fixing device according to claim 1, further comprising:

a grounded housing, wherein the second rotator and the separator are electrically coupled to the housing via the resistor, and wherein each of a creepage distance between the second rotator and the housing and a creepage distance between the separator and the housing is 2.5 mm or more.

5. The fixing device according to claim 1, further comprising:

a belt holder including resin, configured to rotatably hold the first rotator, and attached to the separator, wherein the first rotator is an endless belt.

6. The fixing device according to claim 1, wherein the discharger is disposed between the second rotator and the separator.

7. The fixing device according to claim 1, wherein the discharger is disposed downstream from the nip in a recording medium conveyance direction.

8. The fixing device according to claim 1, wherein the heater includes an insulation layer covering the heat generator and in contact with an inner circumferential surface of the first rotator.

9. The fixing device according to claim 1, wherein the separator is in contact with the first rotator at a position facing a region outside a maximum recording medium passing region through which a recording medium having a maximum width passes.

10. The fixing device according to claim 1, wherein the heater is in direct contact with the first rotator or in contact with a conductive structure that is in contact with the first rotator.

11. A fixing device, according to claim 1, further comprising:

a first rotator;

a second rotator in contact with an outer circumferential surface of the first rotator to form a nip through which a recording medium bearing an unfixed image passes;

a heater including a heat generator and configured to heat the first rotator;

a separator in contact with the outer circumferential surface of the first rotator and configured to separate the recording medium passing through the nip from the first rotator;

a resistor coupling the second rotator and the separator to ground;

a discharger electrically coupled to the resistor and in direct contact with any one of the separator and the second rotator; and a conductor in direct contact with the separator and the second rotator.

12. The fixing device according to claim 11, wherein a volume resistance of the conductor is 110 kΩ or more.

13. The fixing device according to claim 11, wherein the conductor includes is made of conductive resin.

14. The fixing device according to claim 11, wherein:

the conductor is also in direct contact with discharger.

15. The fixing device according to claim 11, further comprising:

a grounded housing, wherein the second rotator and the separator are electrically coupled to the housing via the resistor, and wherein each of a creepage distance between the second rotator and the housing and a creepage distance between the separator and the housing is 2.5 mm or more.

16. The fixing device according to claim 11, further comprising:

a belt holder including resin, configured to rotatably hold the first rotator, and attached to the separator, wherein the first rotator is an endless belt.

17. The fixing device according to claim 11, wherein the heater includes an insulation layer covering the heat generator and is in contact with an inner circumferential surface of the first rotator.

18. The fixing device according to claim 11, wherein the separator is in contact with the first rotator at a position facing a region outside a maximum recording medium passing region through which a recording medium having a maximum width passes.

19. The fixing device according to claim 11, wherein the heater is in direct contact with the first rotator or in contact with a conductive structure that is in contact with the first rotator.

* * * * *